US012726810B2

(12) United States Patent
Nakarmi et al.

(10) Patent No.: US 12,726,810 B2
(45) Date of Patent: Sep. 1, 2026

(54) FUTURE-PROOF PRIVACY

(71) Applicant: Telefonaktiebolaget LM Ericsson (publ), Stockholm (SE)

(72) Inventors: Prajwol Kumar Nakarmi, Sollentuna (SE); David Castellanos Zamora, Madrid (ES); John Mattsson, Täby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 18/420,317

(22) Filed: Jan. 23, 2024

(65) Prior Publication Data

US 2024/0171966 A1 May 23, 2024

Related U.S. Application Data

(62) Division of application No. 16/348,300, filed as application No. PCT/EP2018/086414 on Dec. 20, 2018, now Pat. No. 11,889,293.

(Continued)

(51) Int. Cl.
*H04W 8/22* (2009.01)
*H04W 8/18* (2009.01)
*H04W 8/20* (2009.01)

(52) U.S. Cl.
CPC ............... *H04W 8/22* (2013.01); *H04W 8/18* (2013.01); *H04W 8/183* (2013.01); *H04W 8/20* (2013.01)

(58) Field of Classification Search
None
See application file for complete search history.

(56) References Cited

U.S. PATENT DOCUMENTS 11,785,443 B2 * 10/2023 Nakarmi ................ H04W 8/06 455/435.1
11,785,451 B2 * 10/2023 Nakarmi .............. H04W 8/183 380/270

(Continued)

FOREIGN PATENT DOCUMENTS

JP 2004015667 A 1/2004
JP 2012103436 A 5/2012

(Continued)

OTHER PUBLICATIONS

3GPP TS 31.102 v14.5.0 (Apr. 2018)—3GPP; Technical Specification Group Core Network and Terminals; Characteristics of the Universal Subscriber Identity Module (USIM) application (Release 14). (Year: 2018).*

(Continued)

*Primary Examiner* — Willie J Daniel, Jr.
(74) *Attorney, Agent, or Firm* — COATS & BENNETT, PLLC

(57) ABSTRACT

A network node in a home network, HN, of a wireless device assigns a different priority to each of one or more parameter sets in a priority list. Each parameter set comprises one or more parameters used for calculating the subscription identifier. The network node provides the wireless device with the priority list to facilitate the calculation of the subscription identifier by the wireless device. The wireless device obtains the priority list, and calculates the subscription identifier using a null parameter set or one of the one or more parameter sets in the priority list selected responsive to the defined priorities. The wireless device then informs the HN of the subscription of the wireless device by sending the calculated subscription identifier to the network node.

19 Claims, 18 Drawing Sheets

HN Public Keys
HN public key identifier = 1
HN public key = <no key>
HN public key identifier = 2
HN public key = <binary string>
HN public key identifier = 3
HN public key = <binary string>

Schemes
Scheme identifier = 1
Scheme = null-scheme
Scheme identifier = 2
Scheme = ECIES scheme profile A (EC domain parameters = curve25519, EC Diffie-Hellman primitive = X25519, etc.)
Scheme identifier = 3
Scheme = ECIES scheme profile B (EC domain parameters = curve448, EC Diffie-Hellman primitive = X448, etc.)

PRIORITY_LIST
PRIORITY = 1
Scheme identifier = 1
HN public key identifier = 1
PRIORITY = 2
Scheme identifier = 2
HN public key identifier = 3
PRIORITY = 3
Scheme identifier = 3
HN public key identifier = 2

Related U.S. Application Data

(60) Provisional application No. 62/633,598, filed on Feb. 21, 2018.

(56) References Cited

U.S. PATENT DOCUMENTS

| | | | | |
|---|---|---|---|---|
| 11,889,293 | B2 * | 1/2024 | Nakarmi | H04W 8/18 |
| 2004/0030896 | A1 | 2/2004 | Sakamura et al. | |
| 2013/0003971 | A1 | 1/2013 | Forsberg et al. | |
| 2016/0366707 | A1 | 12/2016 | Sirotkin et al. | |
| 2017/0041733 | A1 | 2/2017 | Babbage et al. | |
| 2019/0098502 | A1 * | 3/2019 | Torvinen | H04W 12/0433 |
| 2019/0246267 | A1 * | 8/2019 | Nakarmi | H04W 8/183 |
| 2020/0162900 | A1 * | 5/2020 | Nakarmi | H04L 63/0414 |
| 2020/0260273 | A1 * | 8/2020 | Bradley | H04L 9/3234 |
| 2020/0359195 | A1 * | 11/2020 | Nakarmi | H04W 48/18 |
| 2021/0021993 | A1 * | 1/2021 | Yang | H04W 12/0433 |
| 2021/0092603 | A1 * | 3/2021 | Yang | H04L 9/0844 |
| 2021/0176628 | A1 * | 6/2021 | Chikkala | H04W 12/06 |

FOREIGN PATENT DOCUMENTS

| | | | |
|---|---|---|---|
| JP | 2017034470 | A | 2/2017 |
| RU | 2643159 | C1 | 1/2018 |
| WO | 2016140823 | A1 | 9/2016 |
| WO | 2019020440 | A1 | 1/2019 |

OTHER PUBLICATIONS

Gemalto, et al., “SUCI calculation in the ME”, 3GPP TSG SA WG3 (Security) Meeting #90Bis, San Diego, US, Feb. 26-Mar. 2, 2018, pp. 1-2, S3-180574, 3GPP.

Nokia, et al., “SUCI intro and handling—Merging and enhancing 6.8.1 and 6.8.2”, TSG SA WG3 (Security) Meeting #90, Gothenburg, Sweden, Jan. 22-26, 2018, pp. 1-2, S3-180078, 3GPP.

Interdigital, “Discussion Paper on the need and ways to make SUPI protection opaque to IMSI sniffers”, 3GPP TSG SA WG3 (Security) Meeting #90-Bis, San Diego, US, Feb. 26-Mar. 2, 2018, pp. 1-9, S3-180505, 3GPP.

Ericsson, “SUCI—readiness to protection schemes update in future”, Change Request, 3GPP TSG-SA WG3 Meeting #91, Belgrade, Serbia, Apr. 16-20, 2018, pp. 1-3, S3-181393, 3GPP.

Nokia, et al., “SUCI intro and handling”, 3GPP TSG SA WG3 (Security) Meeting #90Bis, San Diego, US, Feb. 26-Mar. 2, 2018, pp. 1-2, S3-180764, 3GPP.

3rd Generation Partnership Project, “3rd Generation Partnership Project; Technical Specification Group Service and System Aspects; Security Architecture and Procedures for 5G system (Release 15)”, Technical Specification, 3GPP TS 33.501 V0.6.0, Dec. 2017, pp. 1-79, 3GPP.

* cited by examiner

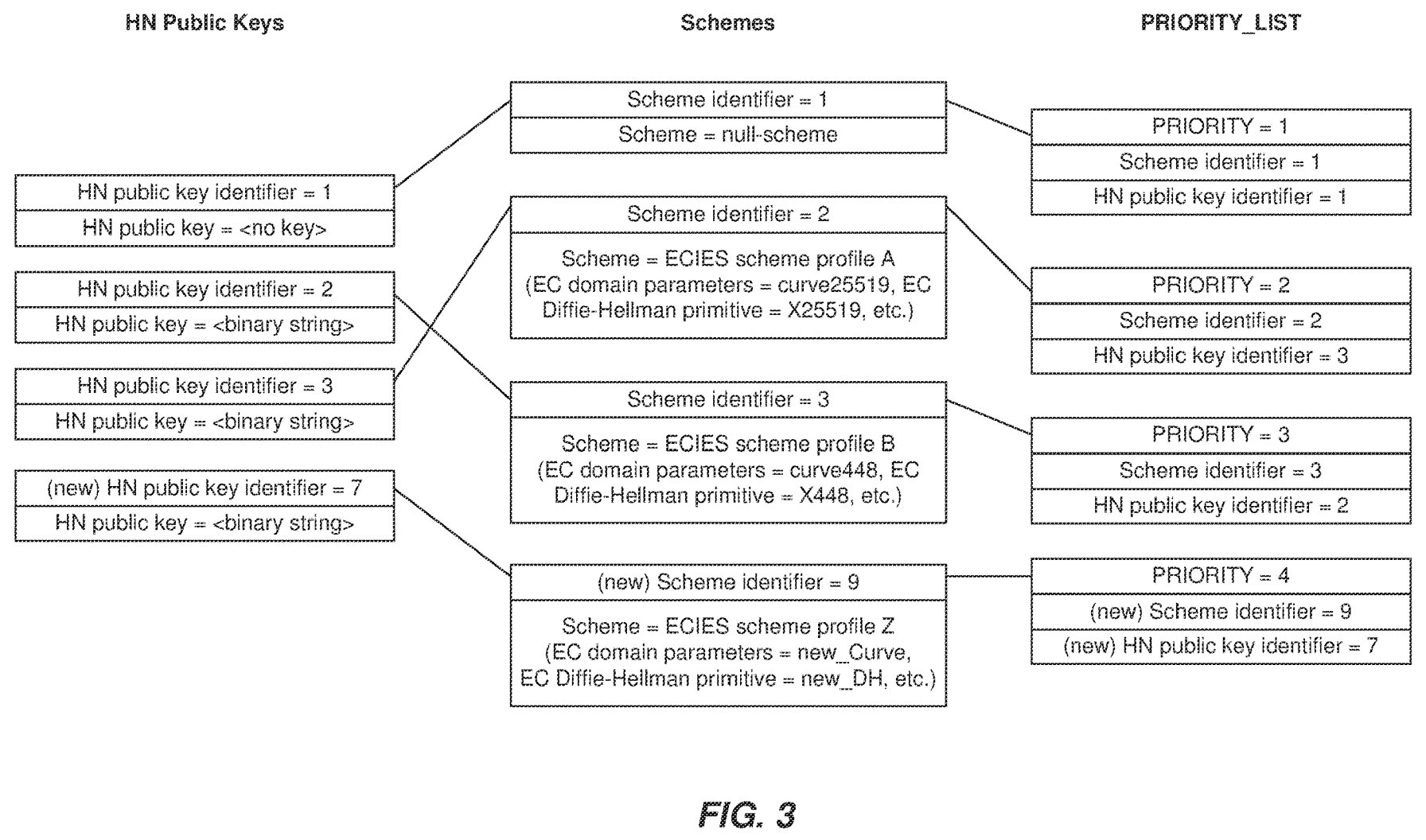

HN Public Keys

HN public key identifier = 1
HN public key = <no key>

HN public key identifier = 2
HN public key = <binary string>

HN public key identifier = 3
HN public key = <binary string>

(new) HN public key identifier = 7
HN public key = <binary string>

Schemes

Scheme identifier = 1
Scheme = null-scheme

Scheme identifier = 2
Scheme = ECIES scheme profile A (EC domain parameters = curve25519, EC Diffie-Hellman primitive = X25519, etc.)

Scheme identifier = 3
Scheme = ECIES scheme profile B (EC domain parameters = curve448, EC Diffie-Hellman primitive = X448, etc.)

(new) Scheme identifier = 9
Scheme = ECIES scheme profile Z (EC domain parameters = new_Curve, EC Diffie-Hellman primitive = new_DH, etc.)

PRIORITY_LIST

PRIORITY = 1
Scheme identifier = 1
HN public key identifier = 1

PRIORITY = 2
Scheme identifier = 2
HN public key identifier = 3

PRIORITY = 3
Scheme identifier = 3
HN public key identifier = 2

PRIORITY = 4
(new) Scheme identifier = 9
(new) HN public key identifier = 7

*FIG. 3*

PRIORITY_LIST

| PRIORITY = 4 |
|---|
| (new) Scheme identifier = 9 |
| (new) HN public key identifier = 7 |

Schemes

| Scheme identifier = 1 |
|---|
| Scheme = null-scheme |

| Scheme identifier = 2 |
|---|
| Scheme = ECIES scheme profile A (EC domain parameters = curve25519, EC Diffie-Hellman primitive = X25519, etc.) |

| Scheme identifier = 3 |
|---|
| Scheme = ECIES scheme profile B (EC domain parameters = curve448, EC Diffie-Hellman primitive = X448, etc.) |

| (new) Scheme identifier = 9 |
|---|
| Scheme = ECIES scheme profile Z (EC domain parameters = new_Curve, EC Diffie-Hellman primitive = new_DH, etc.) |

HN Public Keys

| HN public key identifier = 1 |
|---|
| HN public key = <no key> |

| HN public key identifier = 2 |
|---|
| HN public key = <binary string> |

| HN public key identifier = 3 |
|---|
| HN public key = <binary string> |

| (new) HN public key identifier = 7 |
|---|
| HN public key = <binary string> |

BASE STATION/NETWORK NODE (e.g., in HN)
600

ASSIGNMENT
UNIT/CIRCUIT/
MODULE
610

PROVISIONING
UNIT/CIRCUIT/
MODULE
620

FUTURE-PROOF PRIVACY

This application is a Divisional of prior U.S. application Ser. No. 16/348,300, filed 8 May 2019, which was the National Stage of International Application PCT/EP2018/086414 filed 20 Dec. 2018, which claims the benefit of U.S. Provisional Application No. 62/633,598, filed 21 Feb. 2018, the entire disclosure of each being hereby incorporated by reference herein.

TECHNICAL FIELD

The solution presented herein relates generally to wireless communication systems, and more particularly to identifier encryption according to Home Network preferences.

BACKGROUND

Fifth-Generation (5G) is a next generation of mobile networks developed by a standards developing organization called the Third Generation Partnership Project (3GPP). The earlier generations of mobile networks were called 4G/LTE, 3G/UMTS, and 2G/GSM. A 5G network is maintained and its services are offered by the so-called Mobile Network Operators (MNOs). MNOs are distinguishable from each other by two types of codes, namely the Mobile Country Code (MCC) and the Mobile Network Code (MNC). To use a particular 5G network offered by a particular MNO, users are required to have a sort of contractual relationship with that MNO, that relationship being generally called the subscription. In cases when the user lacks a subscription to some particular MNO (e.g., in a so-called roaming scenario), the relationship is achieved by roaming agreements between the MNO where the user has a subscription, i.e., the user's Home Network (HN) and the MNO that the user is being served, i.e., the Visited Network (VN). Each subscription in a MNO's 5G network is identified by a unique long-term identifier called the Subscription Permanent Identifier (SUPI). Users wirelessly access a 5G network over-the-air using wireless device known as User Equipment (UE). Before providing any service, a 5G network needs to identify a user, i.e., the user's subscription, behind a UE. For this purpose of identification, UEs in earlier generation of mobile networks (4G, 3G, and 2G) used to send users' unique long-term identifier over-the-air. This was considered a privacy issue because users could be tracked or identified by any unauthorized entity capable of intercepting message or acting as man-in-the-middle over-the-air. However, in a 5G network, its MNO has an ability to offer better privacy to its users so that their unique long-term identifiers (i.e., SUPIs) are not visible over-the-air. That ability comes from a mechanism in which UEs, instead of sending SUPIs, calculate and send concealed identifiers over-the-air, which is called the Subscription Concealed Identifier (SUCI). The MNO makes available to UEs all information that are necessary for the calculation of SUCI, denoted encryption parameters.

The calculation of a SUCI means the UE encrypts the SUPI before the SUCI is transferred over-the-air between the UE and the 5G network. In some scenarios, the UE may not be able to make such calculations. Thus, there remains a need for improved SUCI calculations.

SUMMARY

The solution presented herein avoids failure in calculating a subscription identifier, e.g., a Subscription Concealed Identifier (SUCI), identifying a subscription of a wireless device.

One embodiment comprises a method performed by a wireless device for avoiding failure in calculating a subscription identifier identifying a subscription of the wireless device. The method comprises obtaining a priority list of parameter sets. The priority list defines a different priority for each of one or more parameter sets, where each parameter set comprises one or more parameters used for calculating the subscription identifier. The method further comprises calculating the subscription identifier using a null parameter set or one of the one or more parameter sets in the priority list selected responsive to the defined priorities, and informing a Home Network (HN) of the subscription of the wireless device by sending the calculated subscription identifier to a network node in the HN. In one exemplary embodiment, the subscription identifier comprises a Subscription Concealed Identifier (SUCI). In one exemplary embodiment, parameter(s) of each parameter set comprise a scheme identifier and/or a HN public key identifier.

One exemplary embodiment comprises a wireless device. The wireless device comprises communication circuitry and one or more processing circuits. The communication circuitry is configured to send uplink signals to a network node and receive downlink signals from the network node. The processing circuit(s) is/are configured to obtain a priority list of parameter sets. The priority list defines a different priority for each of one or more parameter sets, where each parameter set comprises one or more parameters used for calculating the subscription identifier. The processing circuit(s) is/are further configured to calculate the subscription identifier using a null parameter set or one of the one or more parameter sets in the priority list selected responsive to the defined priorities, and inform a Home Network (HN) of the subscription of the wireless device by sending the calculated subscription identifier to a network node in the HN. In one exemplary embodiment, the subscription identifier comprises a Subscription Concealed Identifier (SUCI). In one exemplary embodiment, parameter(s) of each parameter set comprise a scheme identifier and/or a HN public key identifier.

One exemplary embodiment comprises a wireless device. The wireless device comprises an obtaining circuit, a calculating circuit, and an informing circuit. The obtaining circuit is configured to obtain a priority list of parameter sets. The priority list defines a different priority for each of one or more parameter sets, where each parameter set comprises one or more parameters used for calculating the subscription identifier. The calculating circuit is configured to calculate the subscription identifier using a null parameter set or one of the one or more parameter sets in the priority list selected responsive to the defined priorities. The informing circuit is configured to inform a Home Network (HN) of the subscription of the wireless device by sending the calculated subscription identifier to a network node in the HN. In one exemplary embodiment, the subscription identifier comprises a Subscription Concealed Identifier (SUCI). In one exemplary embodiment, parameter(s) of each parameter set comprise a scheme identifier and/or a HN public key identifier.

One exemplary embodiment comprises a computer program product for controlling a wireless device in communication with a network node. The computer program product comprises software instructions, which, when run on at least one processing circuit in the wireless device, causes the wireless device to obtain a priority list of parameter sets. The priority list defines a different priority for each of one or more parameter sets, where each parameter set comprises one or more parameters used for calculating the subscription identifier. The software instructions, when run on the at least one processing circuit further cause the wireless device to calculate the subscription identifier using a null parameter set or one of the one or more parameter sets in the priority list selected responsive to the defined priorities, and inform a Home Network (HN) of the subscription of the wireless device by sending the calculated subscription identifier to a network node in the HN. In one exemplary embodiment, the subscription identifier comprises a Subscription Concealed Identifier (SUCI). In one exemplary embodiment, parameter (s) of each parameter set comprise a scheme identifier and/or a HN public key identifier. In one exemplary embodiment, a computer-readable medium comprises the computer program product. In one exemplary embodiment, the computer-readable medium comprises a non-transitory computer-readable medium.

One exemplary embodiment comprises a method performed by a network node in a home network (HN) of a wireless device for avoiding failure of a calculation of a subscription identifier by the wireless device. The method comprises assigning a different priority to each of one or more parameter sets in a priority list. Each parameter set comprises one or more parameters used for calculating the subscription identifier. The method further comprises providing the wireless device with the priority list to facilitate the calculation of the subscription identifier by the wireless device. In one exemplary embodiment, the subscription identifier comprises a Subscription Concealed Identifier (SUCI). In one exemplary embodiment, the parameter(s) of each parameter set comprise a scheme identifier and/or a HN public key identifier.

One exemplary embodiment comprises a network node. The network node comprises communication circuitry and one or more processing circuits. The communication circuitry is configured to send downlink signals to a wireless device and receive uplink signals from the wireless device. The processing circuit(s) is/are configured to assign a different priority to each of one or more parameter sets in a priority list. Each parameter set comprises one or more parameters used for calculating the subscription identifier. The processing circuit(s) is/are further configured to provide the wireless device with the priority list to facilitate the calculation of the subscription identifier by the wireless device. In one exemplary embodiment, the subscription identifier comprises a Subscription Concealed Identifier (SUCI). In one exemplary embodiment, the parameter(s) of each parameter set comprise a scheme identifier and/or a HN public key identifier.

One exemplary embodiment comprises a network node. The network node comprises an assignment circuit and a provisioning circuit. The assignment circuit is configured to assign a different priority to each of one or more parameter sets in a priority list. Each parameter set comprises one or more parameters used for calculating the subscription identifier. The provisioning circuit is configured to provide the wireless device with the priority list to facilitate the calculation of the subscription identifier by the wireless device. In one exemplary embodiment, the subscription identifier comprises a Subscription Concealed Identifier (SUCI). In one exemplary embodiment, the parameter(s) of each parameter set comprise a scheme identifier and/or a HN public key identifier.

One exemplary embodiment comprises a computer program product for controlling a network node in communication with a wireless device. The computer program product comprises software instructions, which, when run on at least one processing circuit in the network node, causes the network node to assign a different priority to each of one or more parameter sets in a priority list. Each parameter set comprises one or more parameters used for calculating the subscription identifier. The software instructions, when run on the at least one processing circuit further causes the network node to provide the wireless device with the priority list to facilitate the calculation of the subscription identifier by the wireless device. In one exemplary embodiment, the subscription identifier comprises a Subscription Concealed Identifier (SUCI). In one exemplary embodiment, the parameter(s) of each parameter set comprise a scheme identifier and/or a HN public key identifier. In one exemplary embodiment, the subscription identifier comprises a Subscription Concealed Identifier (SUCI). In one exemplary embodiment, parameter(s) of each parameter set comprise a scheme identifier and/or a HN public key identifier. In one exemplary embodiment, a computer-readable medium comprises the computer program product. In one exemplary embodiment, the computer-readable medium comprises a non-transitory computer-readable medium.

BRIEF DESCRIPTION OF THE DRAWINGS

FIG. 3 shows another example of the solution presented herein according to exemplary embodiments.

FIG. 4 shows another example of the solution presented herein according to exemplary embodiments.

FIG. 5 shows another example of the solution presented herein according to exemplary embodiments.

DETAILED DESCRIPTION

The encryption is of asymmetric type and uses the HN's public key (denoted HN public key). The HN makes the HN public key available to the UE. There could be multiple ways of doing the asymmetric encryption of the SUPI for calculating the SUCI, these ways denoted as encryption schemes. Some examples of the encryption schemes are EIGamal encryption scheme, Elliptic Curve Integrated Encryption Scheme (ECIES), RSA encryption, NTRU Encrypt, and McEliece cryptosystem. There could also be multiple variants of the same scheme, e.g., different elliptic curves could be used with an ECIES scheme like seco256r1, secp384r1, and CURVE25519. There exists also a special encryption scheme named the "null-scheme". This null-scheme does not do any actual encryption, rather produces the same output as the input. It effectively means that a SUCI calculated using the "null-scheme" will comprise of the information in SUPI in clear-text over-the-air. The HN public key and the encryption scheme are two examples of the said encryption parameters. Other examples are, e.g., length of intermediate keys, field lengths (e.g. the message authentication code (MAC) field) and cryptographic primitives (like which HASH).

Figure 1:
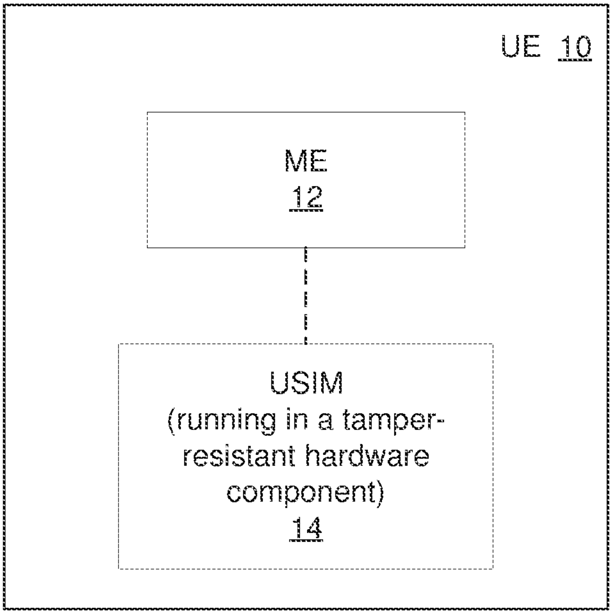
FIG. 1 shows a block diagram of one exemplary User Equipment according to exemplary embodiments.

Before going into further details, it is important to understand some technical aspects of a UE. The UE consists of several parts or components that altogether enable the users of the UE to access the services provided by the network. We are mainly interested in distinguishing two parts on a high level, which will assist in understanding the rest of the document. Those two parts are the Universal Subscriber Identity Module (USIM) and the Mobile Equipment (ME). FIG. 1 illustrates a high level distinction of these parts of a UE.

First, the USIM part is a special software application that provides various functions like providing identifier and authentication of the user's subscription, security key generations, etc. The USIM runs on a tamper resistant secure hardware component, e.g., Universal Integrated Circuit Card (UICC). Second, the ME part denotes the wireless device comprising of hardware and software needed to communicate with the network. The ME is popularly known as mobile phone, or smart phones.

The above mentioned HN public key, along with other information, i.e., encryption scheme parameters, are stored in the USIM part of the UE by the HN. The process of the said storing is generally called provisioning. Over-the-air (OTA) updates are one example of the provisioning.

Whereas the information necessary for calculating the SUCI, i.e., the encryption parameters, is stored or provisioned in the USIM part of the UE, in the UE there are two parts that may actually calculate the SUCI (i.e., computation or implementation of the encryption), either the USIM part or the ME part.

The HN has strong control on its USIM deployments and USIM vendors. Therefore, the capabilities of its USIM, especially the above mentioned encryption schemes supported by its USIM, are known to the HN. This practically means that the HN can choose any encryption scheme, for calculation of the SUCI, based on what its USIM supports.

However, recall that the information necessary for calculating the SUCI, i.e., the encryption parameters, is stored or provisioned in the USIM part of the UE. But, calculation of the SUCI can be performed not only in the USIM, but also in the ME part of the UE.

The HN has little control over ME deployments and ME vendors. In other words, the HN neither has strong control of the capabilities of the MEs, especially the above mentioned encryption schemes supported by the MEs, nor exact information of the capabilities of the MEs. The USIM can be used with a multitude of MEs with different capabilities. If the calculation of SUCI is done in ME, and the HN has chosen an encryption scheme that is not supported by the ME, then the calculation of SUCI will fail. Calculation of the SUCI also may fail if, for example, the ME calculates a subscription identifier that is not implemented by the HN, or not allowed by the HN, or not preferred by the HN due to performance and/or security reasons. As such, it is challenging for the HN to ensure that calculation of SUCI does not fail in ME.

Certain aspects of the solution presented herein may provide solutions to these or other challenges. For example, the solution presented herein enables an HN (or network functions in the HN) to ensure that UE can calculate SUCI according to HN operator preferences, and thus avoids failure in the UE in calculating the subscription identifier.

In view of the embodiments above, the solution presented herein generally includes the following embodiments (non-limiting), e.g., which may address one or more of the issues disclosed herein.

For example, the solution presented herein describes an example method performed by a wireless device for avoiding failure in calculation of SUCI. In an aspect, the example method includes obtaining and storing a PRIORITY_LIST (or "being provisioned with the PRIORITY_LIST") for calculating SUCI. In addition, the method includes calculating SUCI in an order indicated by the PRIORITY_LIST. Furthermore, the method includes sending the calculated SUCI to a home network (HN) of the wireless device.

In addition, the solution presented herein presents an example method performed by a base station (or network node) in a home network (HN) for avoiding failure of a user equipment (UE) (USIM or ME) in calculating SUCI. In an aspect, the example method can include provisioning the UE (USIM or ME) with a PRIORITY_LIST for calculating SUCI.

The solution presented herein proposes a solution that enables a HN (or network functions in the HN) to flexibly, reliably, and in a future-proof manner ensure that UE can calculate SUCI. The flexibility comes from the fact that, according to the example embodiments herein, the HN can choose varieties of encryption parameters according to its preference or need. The reliability comes from the fact that, by implementing the disclosed embodiments, failure to perform calculation of SUCI (either in USIM or in ME part of the UE) can be avoided or at least restricted only to the case where ME does not support the HN operator preferred encryption parameters and fall back to the null-scheme is not acceptable for a given user by the HN operator. Lastly, the future-proof property of the presently disclosed solutions comes from the fact that new encryption parameters can be chosen in the future without breaking calculation of SUCI.

As introduced above, it is challenging for the HN to ensure that calculation of SUCI does not fail in the UE, especially the ME part in the UE. One known technique to address this challenge is to standardize the said encryption schemes. In other words, some encryption schemes could be standardized, say by the 3GPP, and some others could remain proprietary, decided by each HN on its own. The advantage of standardized encryption schemes is that those encryption schemes become publicly available or known, which increases interoperability, e.g., all ME vendors could support the standardized schemes. Some capabilities may be mandatory to support according to the standard specification, but the mandatory capabilities may differ between different versions of the standard, e.g., because mandatory capabilities may be added or removed with each version, because some MEs may not follow the standard, and because different implementations may not be compatible with each other. The advantage of proprietary encryption schemes is that each HN can independently choose and use any encryption scheme suitable to its USIMs, its operational efficiency, security and privacy offerings, or regulatory requirements. It is also known technique that some standardized encryption schemes are made mandatory for the MEs to support, while others are left as optional for MEs to support.

The presently disclosed solutions leverage our contention that the above-mentioned standardized encryption schemes are insufficient. It is so because there are large number of ME vendors and all the vendors, even though support mandatory standardized encryption scheme, do not consistently support optional ones. Let's consider that an HN has provisioned in the USIM (as part of the encryption parameters) that an optional standardized encryption scheme should be used. When that USIM is put into a ME which supports that optional standardized encryption scheme, calculation of SUCI will work fine. But, when that USIM is put into another ME which does not support that optional standardized encryption scheme, calculation of SUCI will fail.

It might occur that standardizing all available encryption schemes and making all of them mandatory for ME to support would solve the above mentioned problem. But it should be understood that doing so is practically infeasible because it becomes extremely costly for ME vendors to support all available encryption schemes. ME implementations will be more complex, development and testing times will also be extremely lengthy and error-prone. The MEs will ultimately become more expensive to end-users. Further, it should also be understood that even though some MEs manage to support all available encryption schemes available today, they will not support any new encryption schemes (for example which are post quantum safe) that will be introduced in future, and the problem remains. The encryption schemes are subjected to evolve, meaning that new encryption schemes could be added in future, e.g., when new elliptic curves are developed, or different cryptographic primitives are selected (like which HASH). Also, existing encryption schemes could be broken by future technologies or simply be deprecated, and the HN would want to select a different encryption scheme. Therefore, when an HN provisions in the USIM (as part of the encryption parameters) that a new standardized encryption scheme should be used, new MEs which support new encryption schemes will work fine. But when that USIM is put in legacy MEs which do not support new encryption schemes, the calculation of SUCI will fail.

In the following, we will describe the novel features of the example embodiments envisioned by the solution presented herein. We propose that the HN provisions the UE with a list of encryption parameters, denoted PRIORITY_LIST. The said PRIORITY_LIST indicates to the UE which encryption parameters are to be tried first for calculation of SUCI, and if those encryption parameters could not be successfully used, which one to try next and so on. The encryption parameters contain at least the encryption schemes. It has been described earlier that other examples of the encryption parameters comprise HN public key and cryptographic primitives (like which HASH). The said PRIORITY_LIST enables the HN to indicate encryption parameters for calculation of SUCI according to its preference and needs, and not be constrained to a list of few mandatory standardized encryption schemes. Therefore, it is a flexible and future proof technique. The said PRIORITY_LIST enables the HN to indicate encryption parameters for calculation of SUCI according to its preference and needs, and not be constrained to a list of few mandatory standardized encryption schemes. Therefore, it is a flexible and future proof technique. If one set or group of encryption parameters cannot be successfully used by the UE, it is possible to make sure that there is at least one another valid alternative. Therefore, it is a reliable technique.

In an example aspect, the provisioning of the PRIORITY_LIST is done in the USIM part of the UE, and the following text takes that assumption. But, whether the said provisioning of the PRIORITY_LIST is done in the USIM or the ME part of the UE is not overly important to the solution presented herein.

In another example aspect, the indication of the PRIORITY_LIST is for the ME part of the UE, and the following text takes that assumption. But, whether the said indication of the PRIORITY_LIST is for the USIM or the ME part of the UE is not overly important to the solution presented herein.

In a further aspect, the calculation of SUCI is done in the ME part of the UE, and the following text takes that assumption. But, it is also not overly important to the solution presented herein whether calculation of SUCI is done in the USIM or the ME part of the UE.

Figure 2:
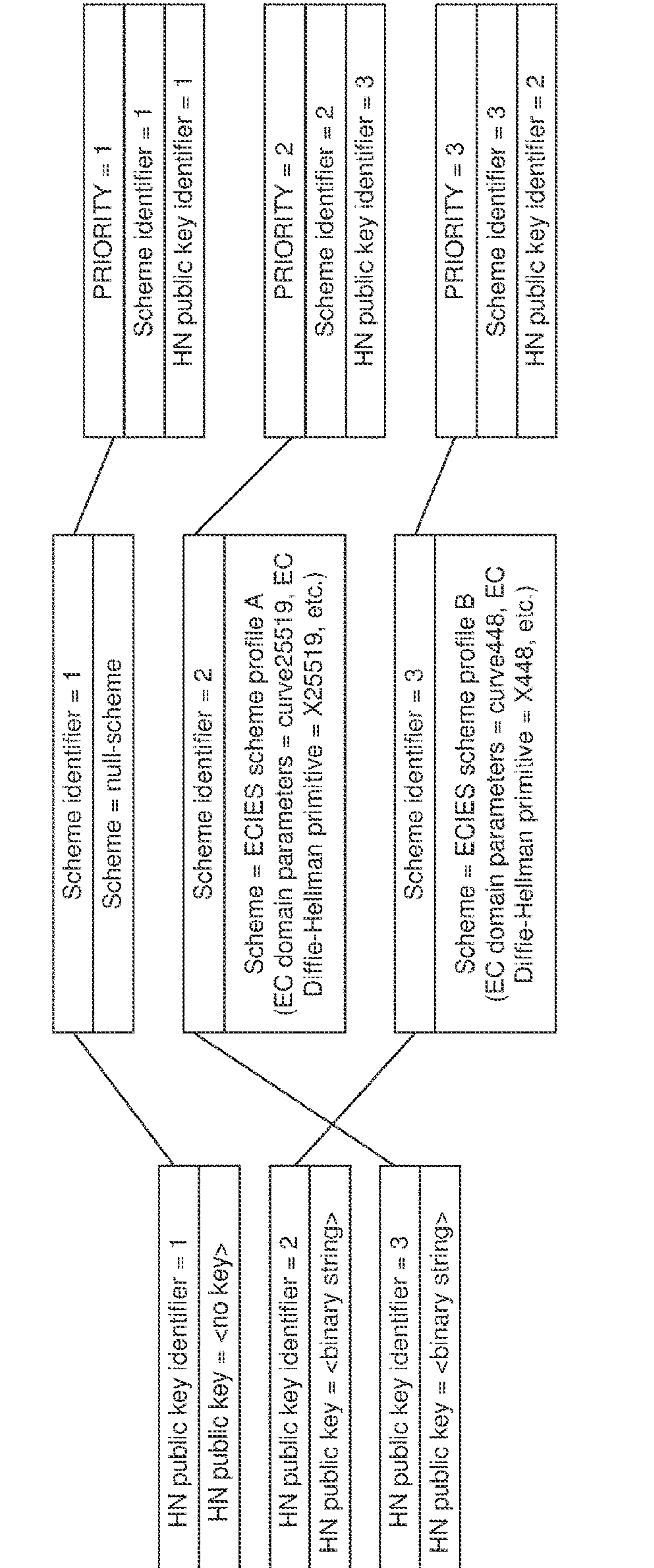
FIG. 2 shows an example of the solution presented herein according to exemplary embodiments.

FIG. 2 illustrates an example embodiment of the solution presented herein. In this example, there are three HN public keys (left column), each with an identifier and the actual key. Mind that the HN public key with identifier 1 is a dummy one. There are three encryption schemes (middle column), each with an identifier and the parameters related to that scheme. Mind that the scheme with identifier 1 is the null-scheme. Scheme 2 is an ECIES scheme with profile A (that uses Curve25519 and DH X25519). Scheme 3 is also an ECIES with profile B (that uses Curve448 and DH X448). The above mentioned PRIORITY_LIST (right column) indicates the priority in which the calculation of SUCI shall be tried. The field shown as PRIORITY is a numeric value. In this example, the higher value of PRIORITY has higher priority, as the name suggests. At least scheme identifier and HN public key identifier are illustrated for each.

In this example, the ME shall first use PRIORITY 3 for calculation of SUCI. That means the ME calculates SUCI using Scheme 3, i.e., using Curve448. In case the ME does not support Curve 448, then ME would know that it shall try Scheme 2 next, i.e., using Curve25519. In case the ME does not even support Curve25519, the ME shall try Scheme 1 next, which is the null-scheme. In this example, null-scheme cannot fail because it is a dummy scheme and produces same output as input. Hence, it should be appreciated that with such PRIORITY_LIST, failure to calculate SUCI at ME is avoided. It should also be appreciated that the teaching is general and applies irrespective of whether the schemes are mandatory standardized scheme, or optional standardized scheme, or proprietary scheme.

Next, we describe a scenario when new encryption parameters are introduced in future. In FIG. 3, there is a new HN public key with identifier 7, a new scheme with identifier 9.

The new scheme is called ECIES scheme profile Z which uses some future curve called new_Curve and future Diffie-Hellman primitive called new_DH. The HN decides to use this new curve and therefore adds a new PRIORITY with value 4 which takes the new scheme and new HN public key into use. The new MEs that support the new scheme will be able to calculate SUCI using the highest PRIORITY 4, whereas the legacy MEs will fall back to PRIORITY 3. It should be appreciated that with this technique, the HN is able to rollout the use of new scheme without worrying about locking out the legacy MEs. When all the MEs get updated to support the new scheme, the HN could then phase out older schemes.

If the HN has very strict requirement on certain subscriptions that only the latest scheme shall be used. This may be the case when stricter privacy is important than providing service. So, the HN could set the PRIORITY_LIST as shown in FIG. 4. In this case, the ME does not have any scheme to fall back to. If the ME does not support the scheme indicated by PRIORITY 4, then calculation of SUCI fails, as intended by the HN.

Figure 5:
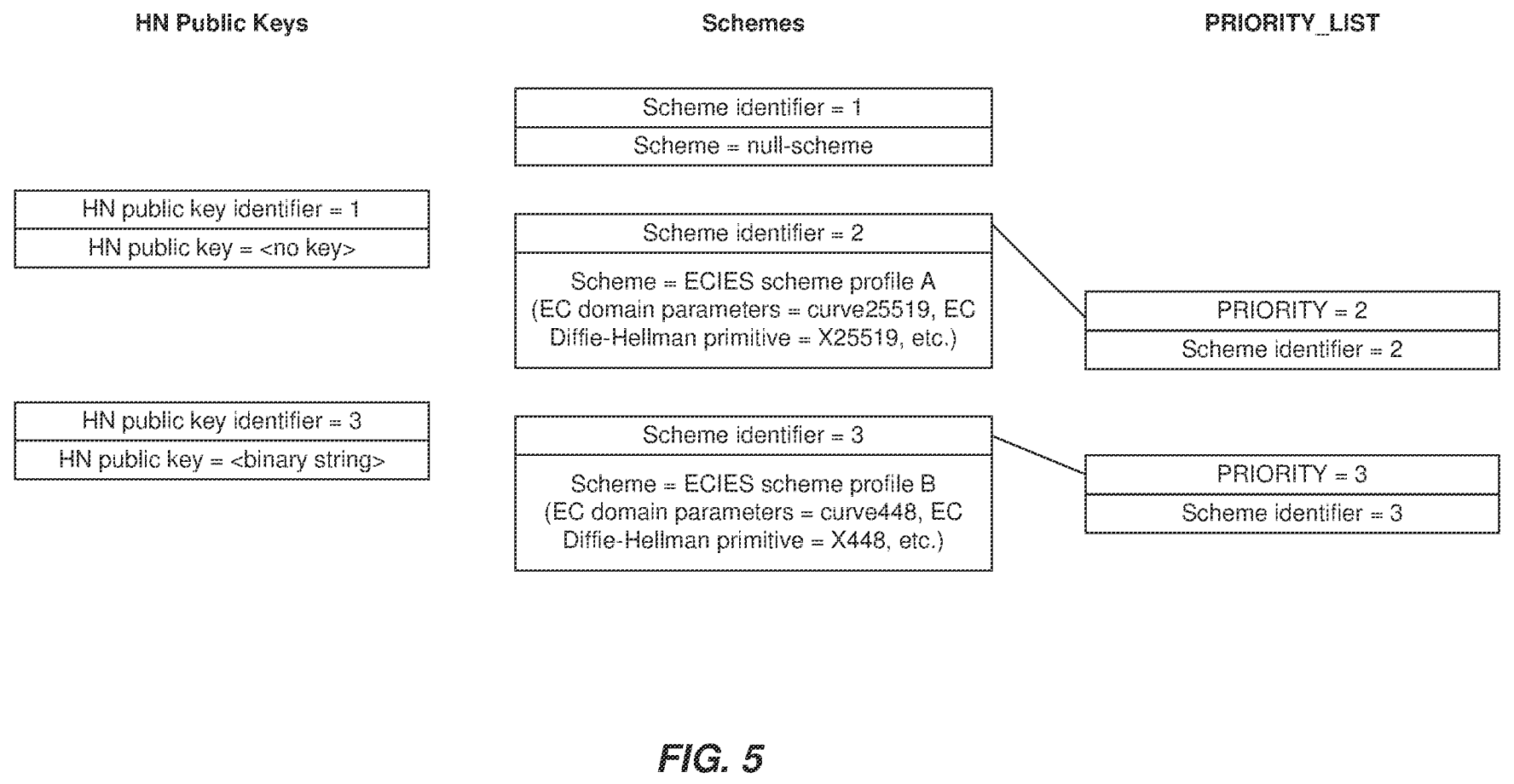

The ME could also interpret the content of the PRIORITY_LIST so that the ME chooses the first PRIORITY the UE supports in the PRIORITY_LIST and for which the corresponding HN public key is available. FIG. 5 illustrates the same. It is different than above embodiments. The PRIORITY_LIST in FIG. 5 contains only the scheme identifiers. In this example, the HN public key 3 is the one that has HN public key for Curve25519, i.e., HN public key 3 is compatible with Scheme 2. The ME supports both the Curve25519 and Curve448. So, the ME chooses Scheme 3 according to PRIORITY 3. The ME then tries to obtain a HN public key that is compatible with the Curve448 and finds none. Therefore, the ME falls back to PRIORITY 2 and tries to obtain a HN public key that is compatible with the Curve25519. The ME obtains HN public key 3 and proceeds to calculate SUCI.

Figure 6:
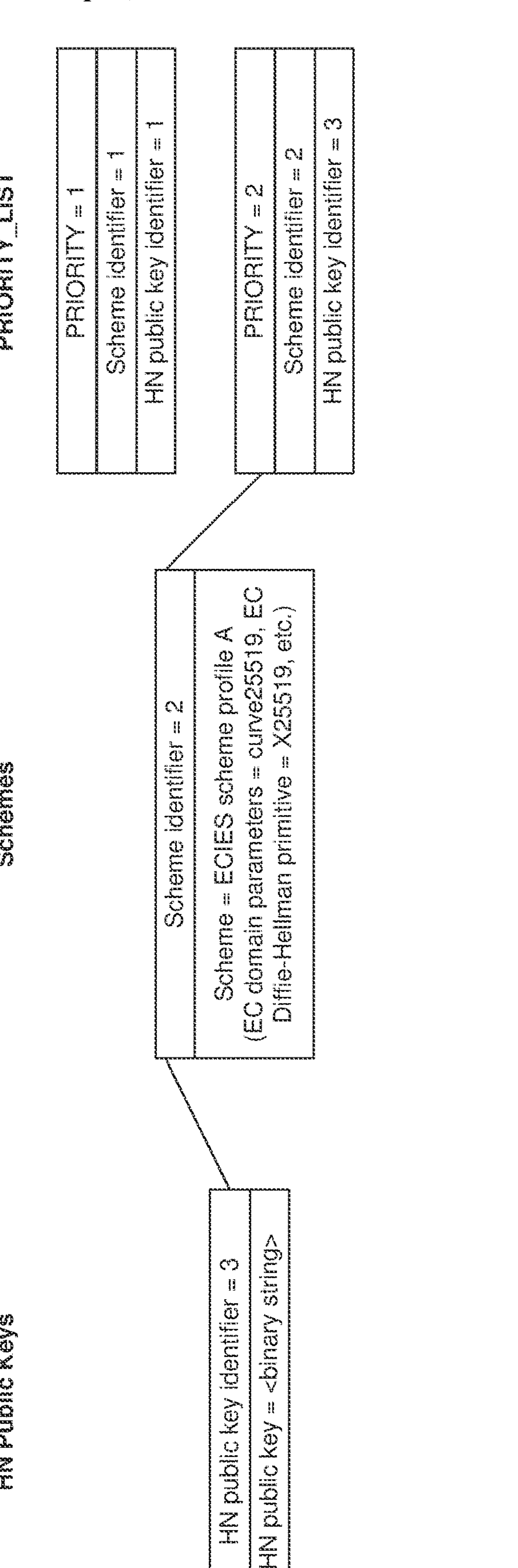
FIG. 6 shows another example of the solution presented herein according to exemplary embodiments.

FIG. 6 shows yet another embodiment of specifying PRIORITY. In this embodiment, the assumption is that USIM part of the UE supports calculation of SUCI. How the USIM calculates SUCI is not overly important for this embodiment. Even though the USIM supports calculation of SUCI, the HN has chosen that calculation of SUCI is to be performed in ME part of the UE. The reason could be that ME has some latest implementation which is preferred over that in USIM. In that case, the PRIORITY could indicate that if ME does not support the indicated PRIORITY, then calculation shall fall back to USIM. Therefore, if the ME supports Curve25519, then it will calculate SUCI. Otherwise, the ME indicates to USIM that the USIM shall calculate SUCI.

One of other teachings is about HN's action upon detecting that the UE (ME or USIM) has used one of lower PRIORITY schemes. The UE sends SUCI the HN. That SUCI comprises of HN public key identifier and scheme identifier among other fields. These HN public key identifier and scheme identifier enables the HN is able to determine whether or not the ME (or USIM) has used the top-most PRIORITY. The UE could as well send the PRIORITY that was used. Now, if the HN detects that the UE has used one of lower PRIORITY schemes, the HN could perform additional actions such as creating log of the selection of the lower priority parameter set, contacting the end-users to update their USIM or ME, re-provisioning the encryption parameters to the UE, etc.

Another teaching is about UE indicating to the HN, the reason for selecting lower PRIORITY scheme, when applicable. The reason for ME choosing lower PRIORITY scheme could also be some error in provisioning, e.g., incorrect HN public key, incorrect scheme identifier, etc. The said indication could be performed by sending an additional field in or along with the SUCI that the UE sends to the HN. The said reason enables the HN to detect any potential mis-provisioning, or to detect any potential mis-implementation of the USIM or ME. The said reason could be encoded as pre-defined integer, or string value explaining the cause. Some examples of string values for the said reason are "Curve448 not supported", "Corresponding HN public key for Curve448 not available", "Scheme identifier 3 is not recognized", etc. The HN could perform additional actions such as creating log, contacting the ME vendors about mis-implementation, re-provisioning the encryption parameters, etc.

Yet another teaching is that the UE indicates its supported schemes to HN. Such indication could be sent via USIM or via VN. Such indication enables the HN to determine that the UE supports and to provision the USIM with only the supported encryption schemes. Doing so could save memory of file space in USIM storage.

Figure 7:
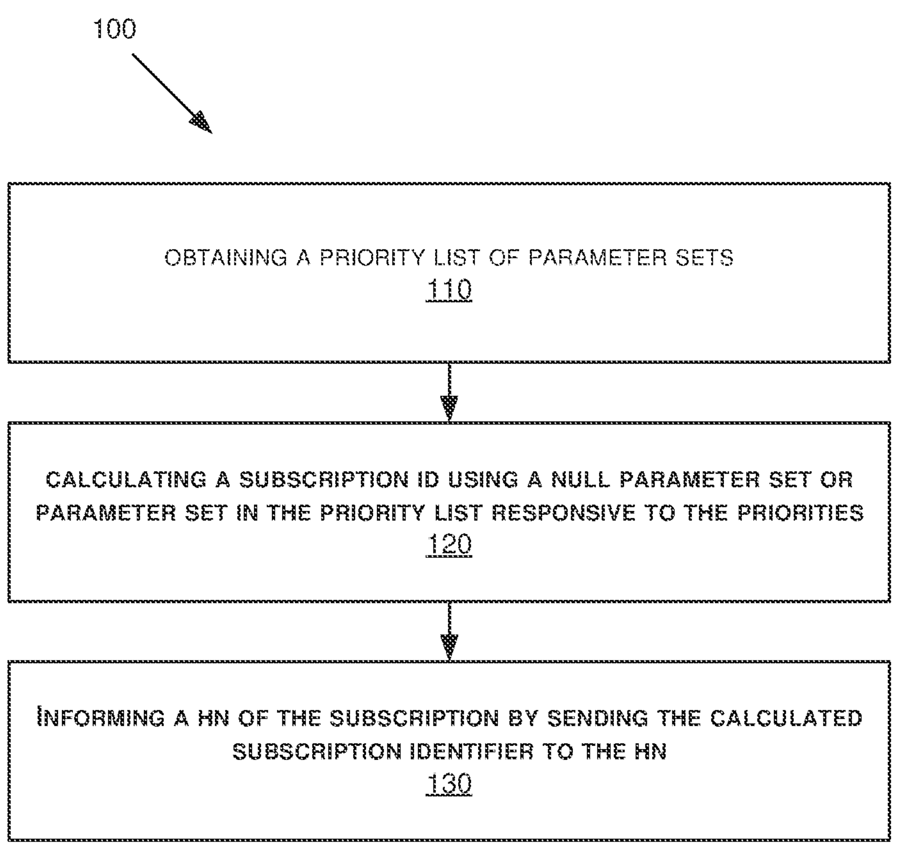
FIG. 7 shows a wireless device method according to exemplary embodiments.

FIG. 7 depicts a method 100 performed by a wireless device, e.g., UE 10, for avoiding failure in calculation of a subscription identifier identifying a subscription of the UE 10, e.g., a SUCI. In an aspect, the example method 100 includes obtaining a PRIORITY_LIST of parameter sets (e.g., "being provisioned with the PRIORITY_LIST") for calculating the subscription identifier (block 110). The PRIORITY_LIST defines a different priority for each of one or more parameter sets, where each parameter set comprises one of the parameters used for calculating the subscription identifier. Exemplary parameters include, but are not limited to, a scheme identifier and/or an HN public key identifier. In addition, the method 100 includes calculating the subscription identifier using a null parameter set or one of the parameter sets in the PRIORITY_LIST selected responsive to the defined priorities (block 120). Furthermore, the method 100 includes informing an HN of the UE 10 of the subscription by sending the calculated subscription identifier to the HN (block 130).

In addition, although not shown explicitly in FIG. 7, the method 100 can also include one or more of the following aspects: sending an indication of PRIORITY to the HN; selecting the highest priority in the priority list for calculating the SUCI; selecting a lower priority than a highest priority in the PRIORITY_LIST for calculating SUCI; sending, to the HN, a reason for selecting the lower priority in the PRIORITY_LIST; and/or sending supported schemes to the HN. In an aspect, any of the above aspects of the method 100 can be performed wholly or in part by a USIM 14 or ME 12 of the wireless device 10.

Figure 8:
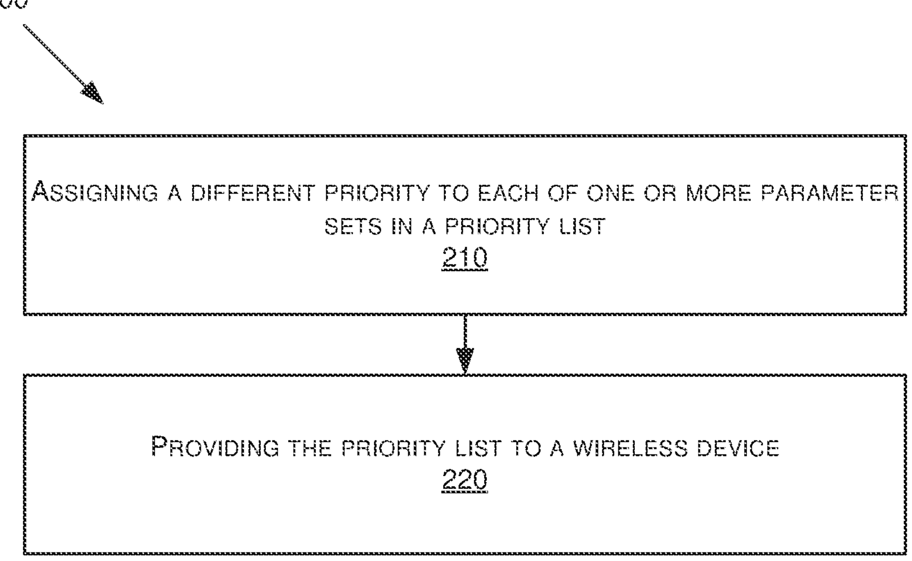
FIG. 8 shows a network node method according to exemplary embodiments.

FIG. 8 depicts a method 200 performed by a base station (or network node) in a home network (HN) for avoiding failure of a wireless device e.g., UE10 (USIM 14 or ME 12), in calculating a subscription identifier, e.g., SUCI. In an aspect, the example method 200 comprises assigning a different priority to each of one or more parameter sets in a PRIORITY_LIST (block 210). Each parameter set comprises one or more parameters used for calculating the subscription identifier. Exemplary parameters include, but are not limited to, a scheme identifier and/or an HN public key identifier. In addition, the method 200 includes providing the UE 10 (USIM 14 or ME 12) with the PRIORITY_LIST to facilitate the calculation of the subscription identifier (block 220). In some embodiments, the method 200 can also include detecting that the UE 10 selected a lower priority than a highest priority in the PRIORITY_LIST for calculating SUCI based on one or more of: an HN public key identifier sent by the UE 10, a scheme identifier sent by the UE 10, a PRIORITY indication sent by the wireless device 10, and/or a reason sent by the UE 10. In a further aspect of the method 200 of FIG. 8, the network node/base station can, based on detecting that the UE 10 selected the lower priority, perform one or more of: re-provisioning the UE 10 (USIM 14 or ME 12) with the priority list, informing ME vendors of the detection, informing USIM vendors of the detection, and/or creating a log of the selection of the lower priority parameter set. In addition, the method 200 can optionally include receiving one or more schemes supported by the UE 10 and performing the provisioning of the UE 10 based on the received one or more schemes.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
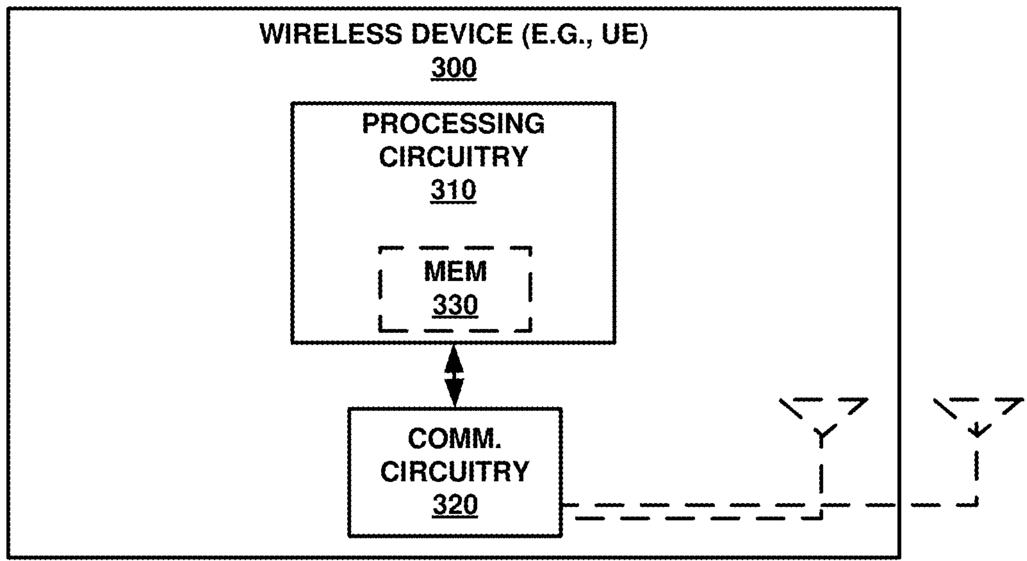
FIG. 9 shows a method according to exemplary embodiments.

FIG. 9, for example, shows a wireless device 300 as implemented in accordance with one or more embodiments. The wireless device 300 corresponds to the UE 10 of FIG. 1. As shown, wireless device 300 includes processing circuitry 310 and communication circuitry 320. The communication circuitry 320 (e.g., radio circuitry) is configured to transmit and/or receive information to and/or from one or more other nodes, e.g., via any communication technology. Such communication may occur via one or more antennas that are either internal or external to the wireless device 300. The processing circuitry 310 is configured to perform processing described above (e.g., method 100), such as by executing instructions stored in memory 330. The processing circuitry 310 in this regard may implement certain functional means, units, circuits, or modules.

Figure 10:
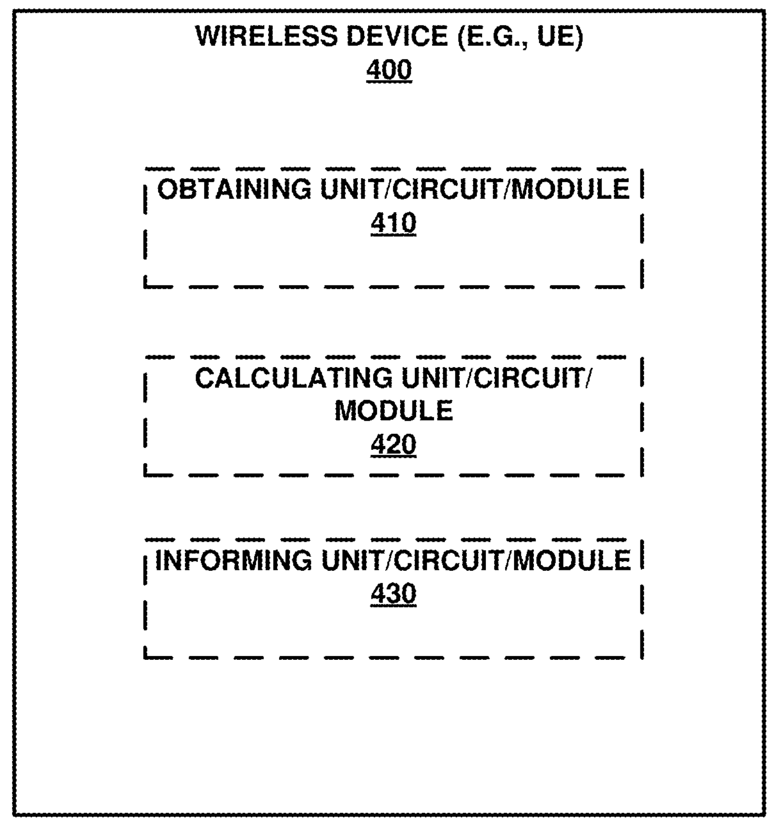
FIG. 10 shows a method according to exemplary embodiments.
Figure 13:
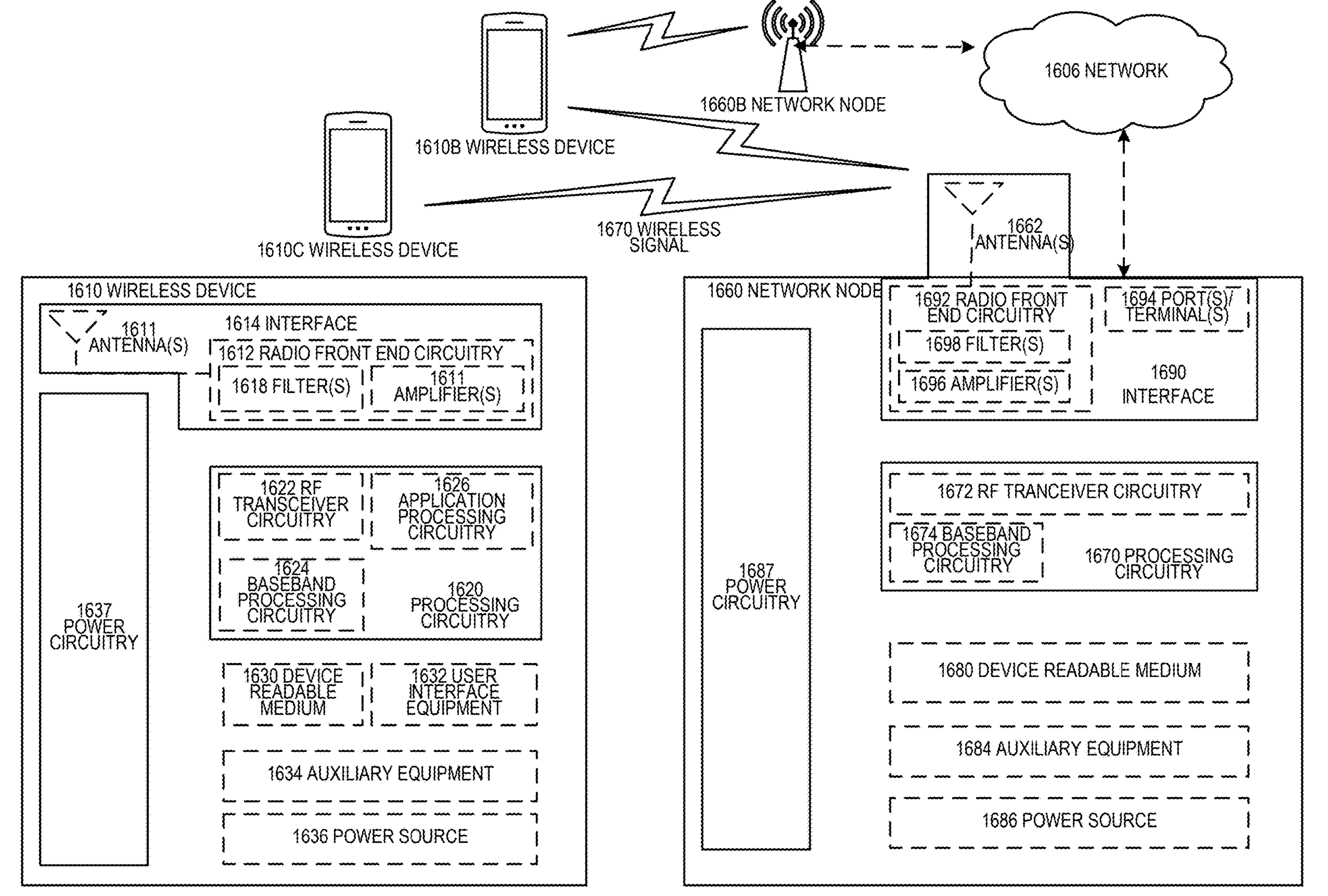
FIG. 13 shows an exemplary wireless network applicable to the solution presented herein.

FIG. 10 shows a schematic block diagram of an wireless device 400, which also corresponds to UE 10, in a wireless network according to still other embodiments (for example, the wireless network shown in FIG. 13). As shown, the wireless device 400 implements various functional means, units, circuits, or modules, e.g., via the processing circuitry 310 in FIG. 9 and/or via software code. These functional means, units, circuits, or modules, e.g., for implementing the method(s) herein, include for instance: obtaining unit/circuit/module 410, calculating unit/circuit/module 420, and informing unit/circuit/module 430, configured to perform aspects described above and in particular in the Group A examples below.

Figures 11, 12:
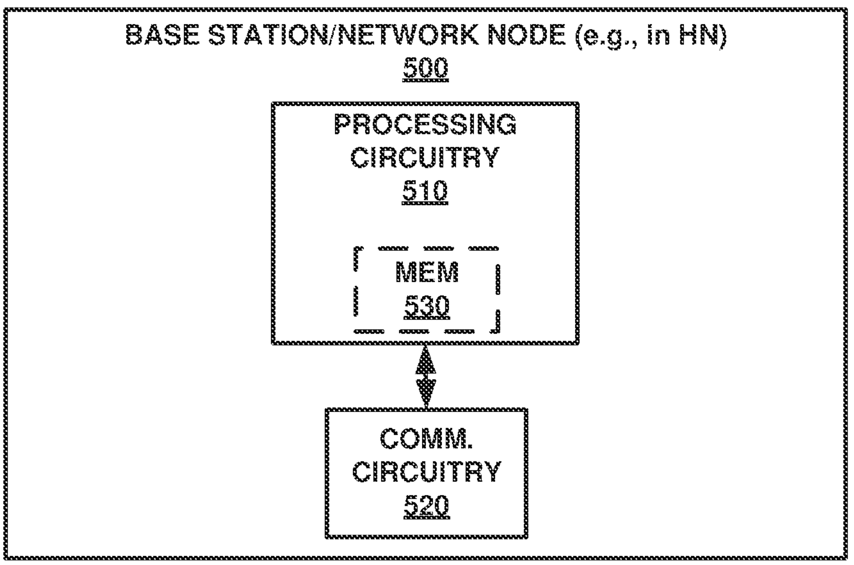
FIG. 11 shows a block diagram of a network node according to exemplary embodiments.
FIG. 12 shows a block diagram of a network node according to exemplary embodiments.

FIG. 11 shows a network node 500 as implemented in accordance with one or more embodiments. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, such as by executing instructions stored in memory 530. The processing circuitry 510 in this regard may implement certain functional means, units, circuits, or modules.

FIG. 12 shows a schematic block diagram of a network node 600 in a wireless network according to still other embodiments (for example, the wireless network shown in FIG. 13). As shown, the network node 600 implements various functional means, units, circuits, or modules, e.g., via the processing circuitry 510 in FIG. 11 and/or via software code. These functional means, units, circuits, or modules, e.g., for implementing the method(s) herein, include for instance: assignment unit/circuit/module 610 and provisioning unit/circuit/module 620, which are configured to perform aspects of the enumerated examples of Group B below.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1606, network nodes 1660 and 1660*b*, and WDs 1610, 1610*b*, and 1610*c*. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signaling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 13 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 14:
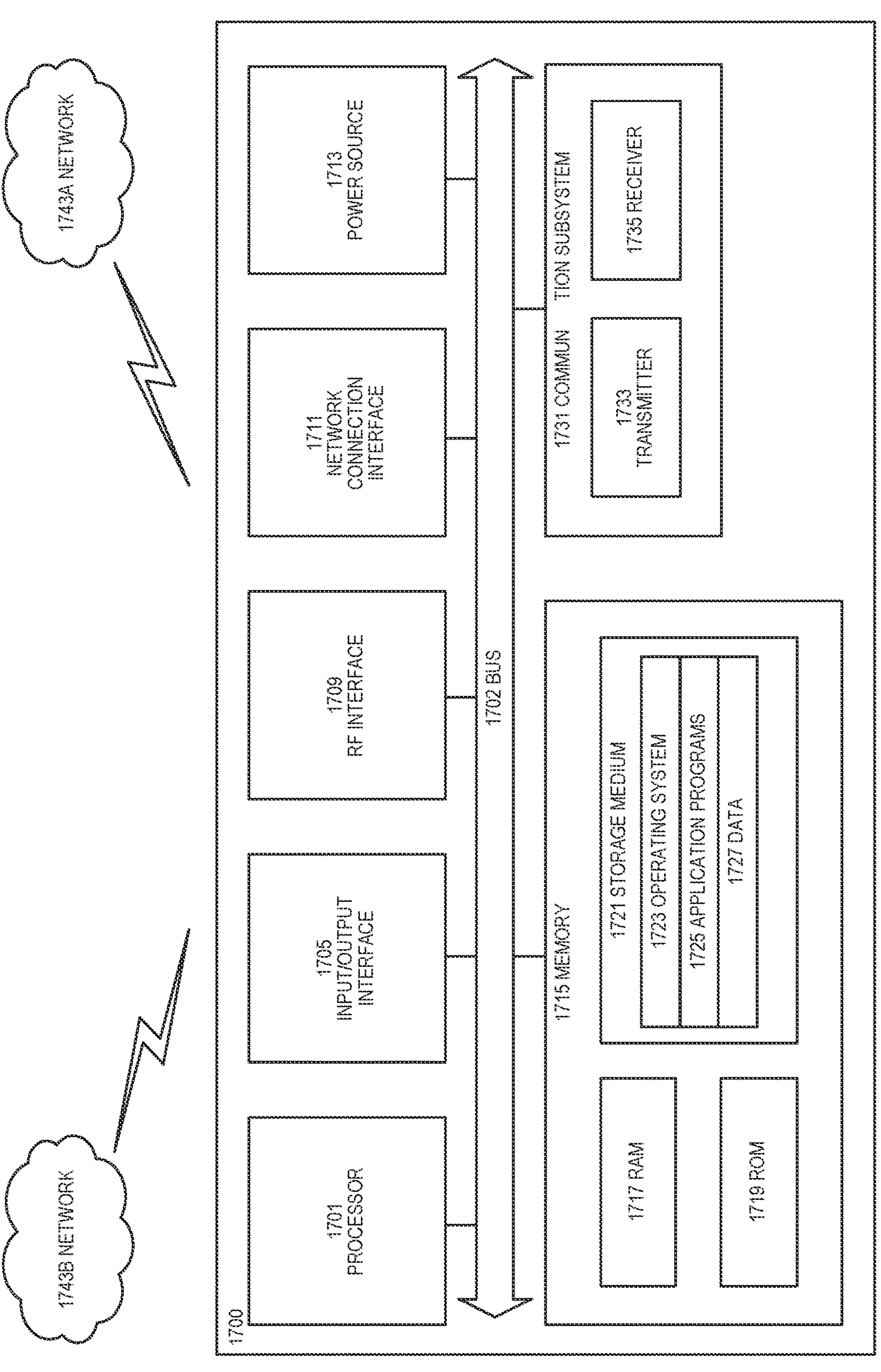
FIG. 14 shows an exemplary UE applicable to the solution presented herein.

FIG. 14 illustrates one embodiment of a UE in accordance with various aspects described herein. As used herein, a User equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1720 may be any UE identified by the 3rd Generation Partnership Project (3GPP), including a NB-IoT UE, a machine type communication (MTC) UE, and/or an enhanced MTC (eMTC) UE. UE 1700, as illustrated in FIG. 14, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1709 may be configured to provide a communication interface to RF components such as a transmitter, a receiver, and an antenna. Network connection interface 1711 may be configured to provide a communication interface to network **1743*a*. Network 1743*a* may encompass wired and/or wireless networks such as a local-area network (LAN), a wide-area network (WAN), a computer network, a wireless network, a telecommunications network, another like network or any combination thereof. For example, network 1743*a* may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711** may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 14, processing circuitry 1701 may be configured to communicate with network **1743*b* using communication subsystem 1731. Network 1743*a* and network 1743*b* may be the same network or networks or different network or networks. Communication subsystem 1731 may be configured to include one or more transceivers used to communicate with network 1743*b*. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735** of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network **1743*b* may encompass wired and/or wireless networks such as a local-area network (LAN), a wide-area network (WAN), a computer network, a wireless network, a telecommunications network, another like network or any combination thereof. For example, network 1743*b* may be a cellular network, a Wi-Fi network, and/or a near-field network. Power source 1713 may be configured to provide alternating current (AC) or direct current (DC) power to components of UE 1700**.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 15:
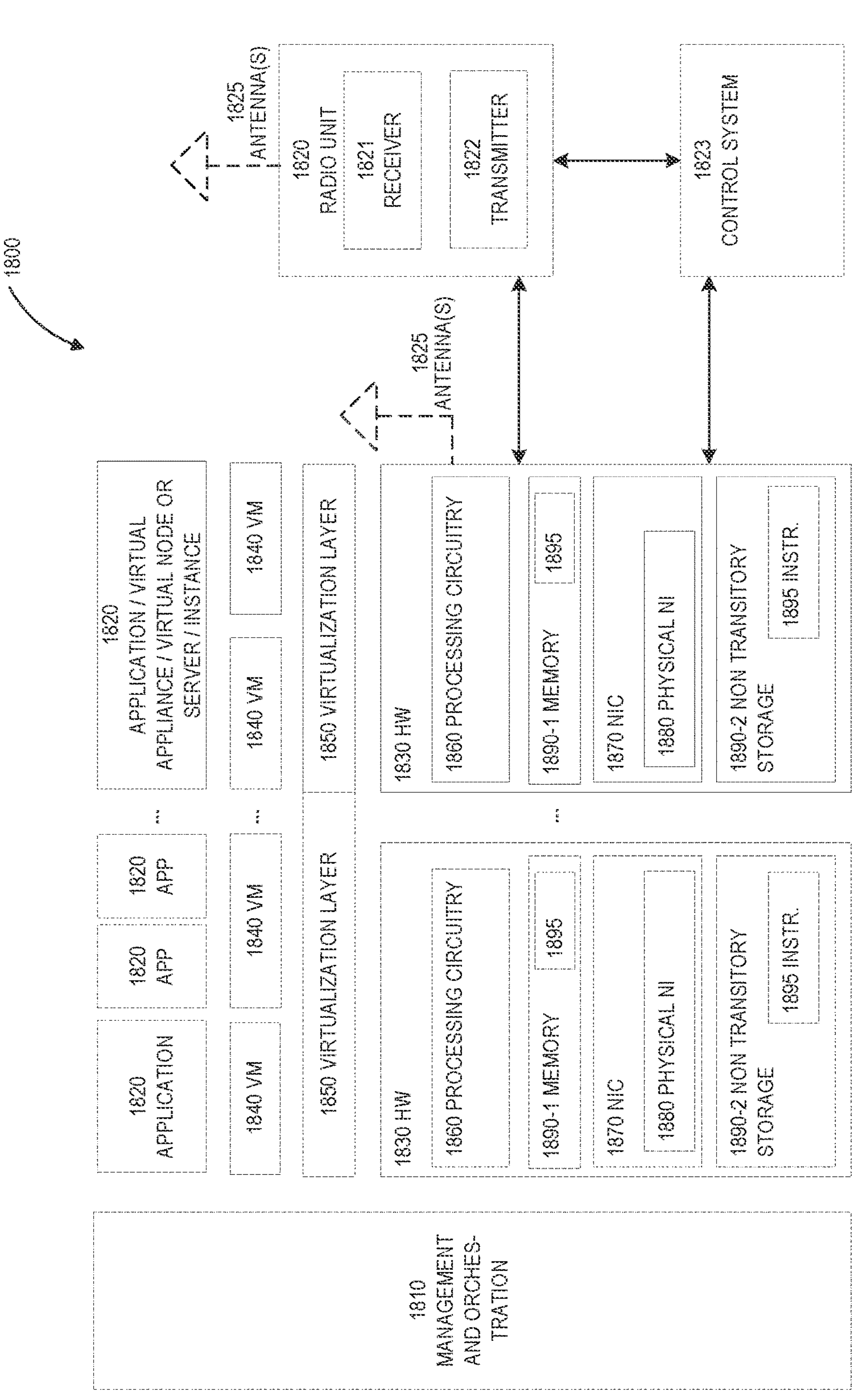
FIG. 15 shows an exemplary virtualization environment applicable to the solution presented herein.

FIG. 15 is a schematic block diagram illustrating a virtualization environment 1800 in which functions implemented by some embodiments may be virtualized. In the present context, virtualizing means creating virtual versions of apparatuses or devices, which may include virtualizing hardware platforms, storage devices, and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 15, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 1810, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 15.

In some embodiments, one or more radio units 1820 that each include one or more transmitters 1822 and one or more receivers 1821 may be coupled to one or more antennas 1825. Radio units 1820 may communicate directly with hardware nodes 1830 via one or more appropriate network interfaces and may be used in combination with the virtual components to provide a virtual node with radio capabilities, such as a radio access node or a base station.

In some embodiments, some signaling can be effected with the use of control system 1823 which may alternatively be used for communication between the hardware nodes 1830 and radio units 1820.

Figure 16:
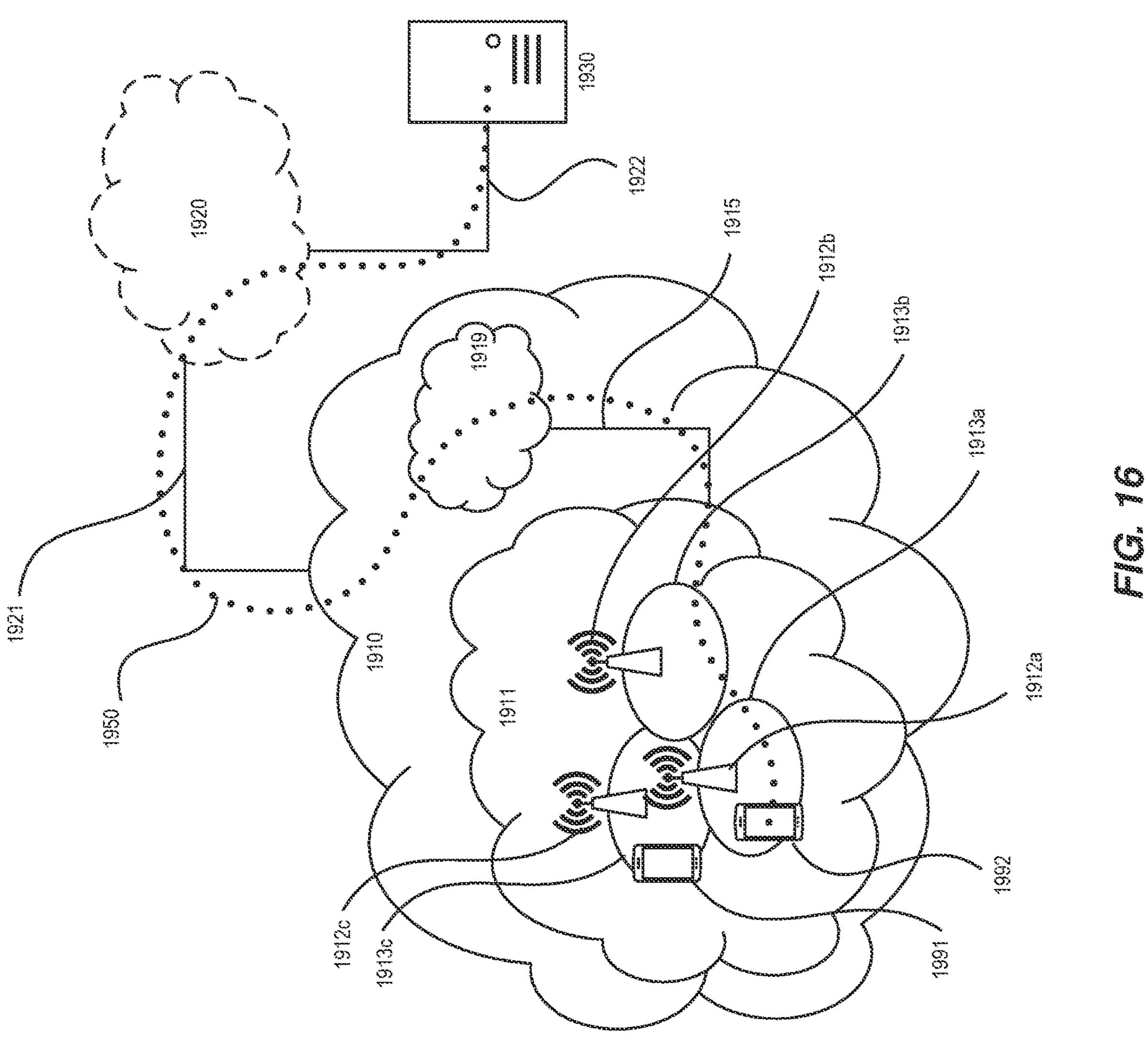
FIG. 16 shows an exemplary telecommunications network applicable to the solution presented herein.

FIG. 16 illustrates a telecommunication network connected via an intermediate network to a host computer in accordance with some embodiments. In particular, with reference to FIG. 16, in accordance with an embodiment, a communication system includes telecommunication network 1910, such as a 3GPP-type cellular network, which comprises access network 1911, such as a radio access network, and core network 1914. Access network 1911 comprises a plurality of base stations 1912*a*, 1912*b*, 1912*c*, such as NBs, eNBs, gNBs or other types of wireless access points, each defining a corresponding coverage area 1913*a*, 1913*b*, 1913*c*. Each base station 1912*a*, 1912*b*, 1912*c* is connectable to core network 1914 over a wired or wireless connection 1915. A first UE 1991 located in coverage area 1913*c* is configured to wirelessly connect to, or be paged by, the corresponding base station 1912*c*. A second UE 1992 in coverage area 1913*a* is wirelessly connectable to the corresponding base station 1912*a*. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server, or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 16 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 17:
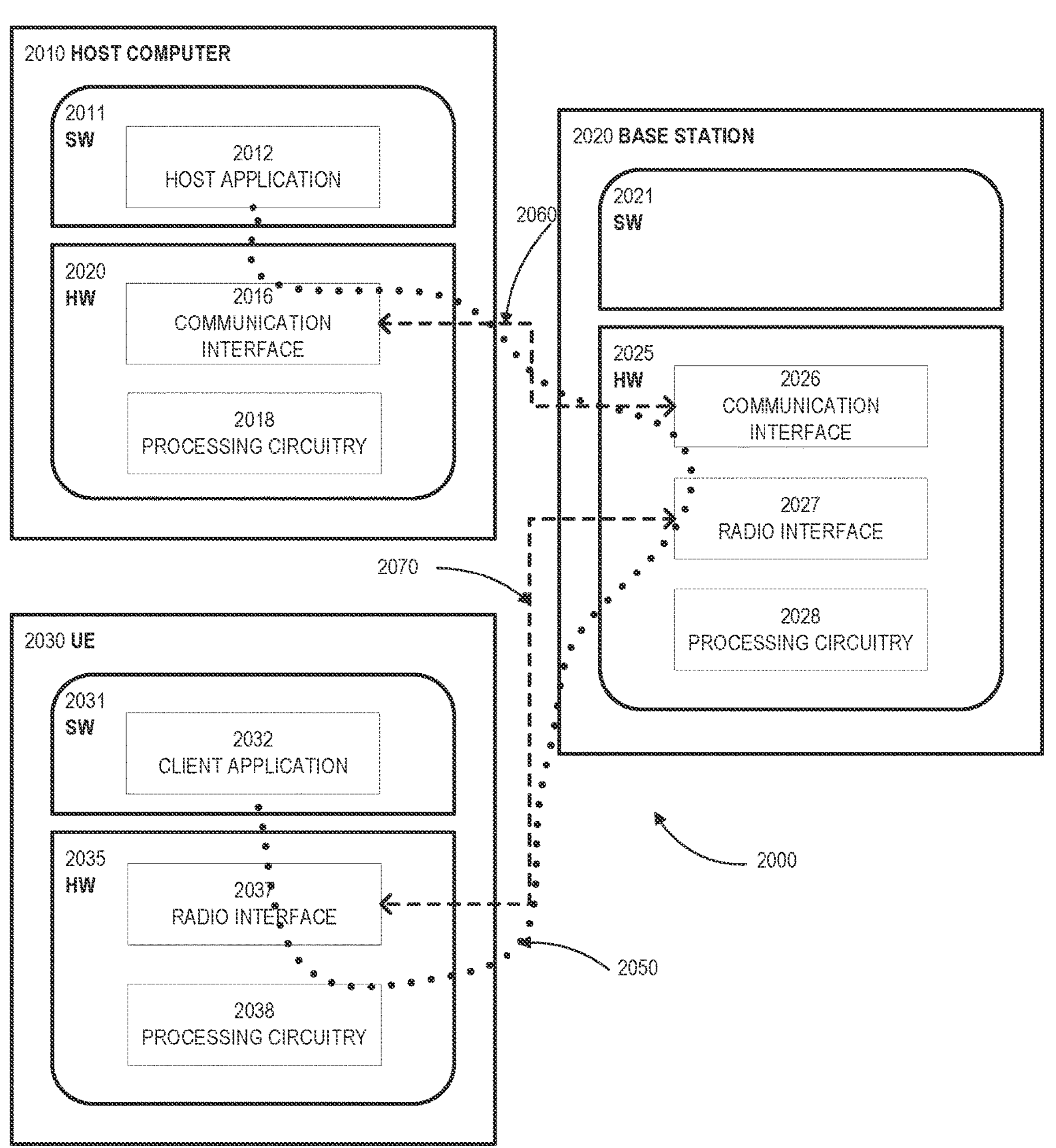
FIG. 17 shows an exemplary host computer applicable to the solution presented herein.

Example implementations, in accordance with an embodiment, of the UE, base station and host computer discussed in the preceding paragraphs will now be described with reference to FIG. 17. FIG. 17 illustrates host computer communicating via a base station with a user equipment over a partially wireless connection in accordance with some embodiments In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 17) served by base station 2020. Communication interface 2026 may be configured to facilitate connection 2060 to host computer 2010. Connection 2060 may be direct or it may pass through a core network (not shown in FIG. 17) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 17 may be similar or identical to host computer 2030, one of base stations 2012*a*, 2012*b*, 2012*c* and one of UEs 2091, 2092 of FIG. 17, respectively. This is to say, the inner workings of these entities may be as shown in FIG. 17 and independently, the surrounding network topology may be that of FIG. 1176.

In FIG. 17, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described herein. One or more of the various embodiments improve the performance of OTT services provided to UE 2030 using OTT connection 2050, in which wireless connection 2070 forms the last segment.

A measurement procedure may be provided for the purpose of monitoring data rate, latency and other factors on which the one or more embodiments improve. There may further be optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or by supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 18:
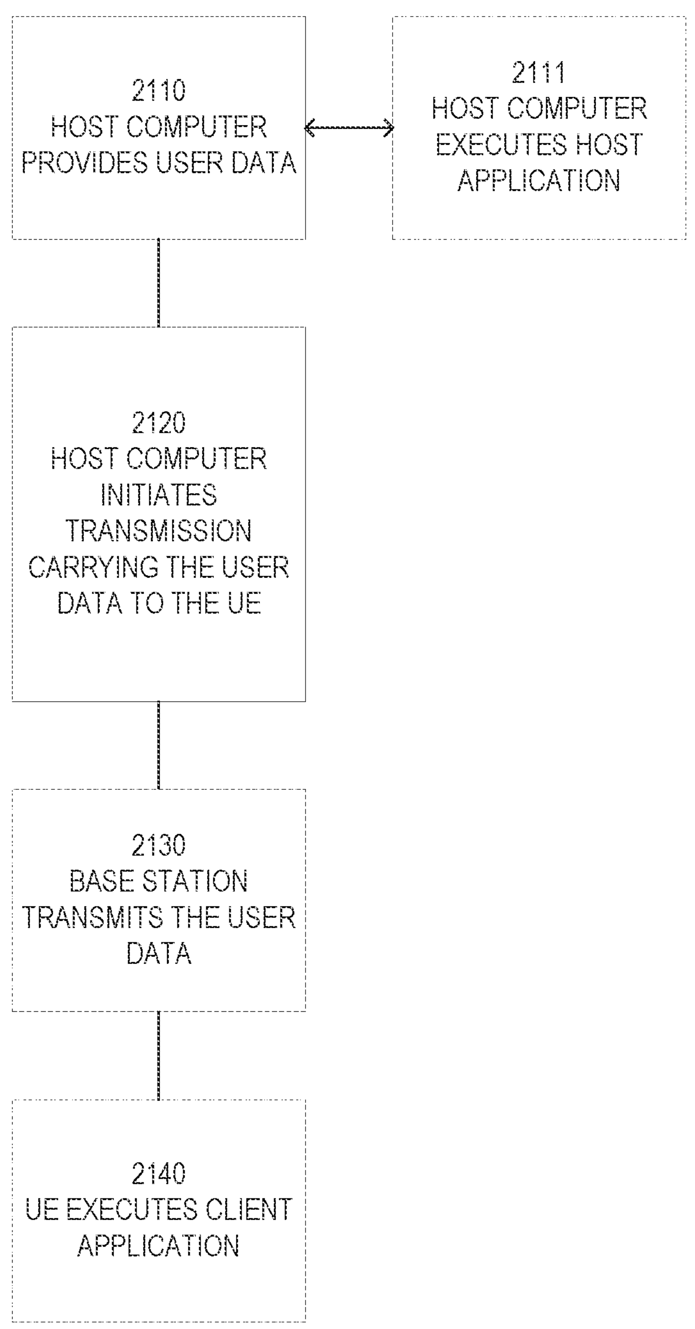
FIG. 18 shows an exemplary method implemented in a communication system in accordance with embodiments of the solution presented herein.

FIG. 18 is a flowchart illustrating a method implemented in a communication system, in accordance with one embodiment. The communication system includes a host computer, a base station and a UE which may be those described with reference to FIGS. 16 and 17. For simplicity of the solution presented herein, only drawing references to FIG. 18 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described herein. In step 2140 (which may also be optional), the UE executes a client application associated with the host application executed by the host computer.

Figure 19:
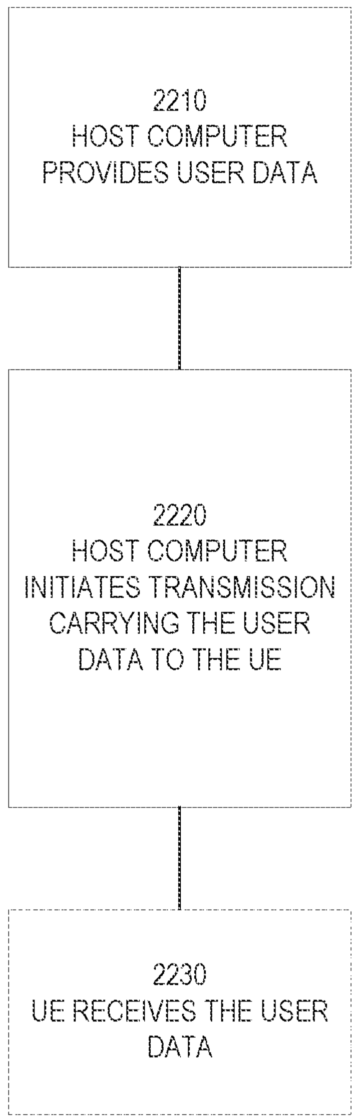
FIG. 19 shows another exemplary method implemented in a communication system in accordance with embodiments of the solution presented herein.

FIG. 19 is a flowchart illustrating a method implemented in a communication system, in accordance with one embodiment. The communication system includes a host computer, a base station and a UE which may be those described with reference to FIGS. 16 and 17. For simplicity of the solution presented herein, only drawing references to FIG. 19 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described herein. In step 2230 (which may be optional), the UE receives the user data carried in the transmission.

Figure 20:
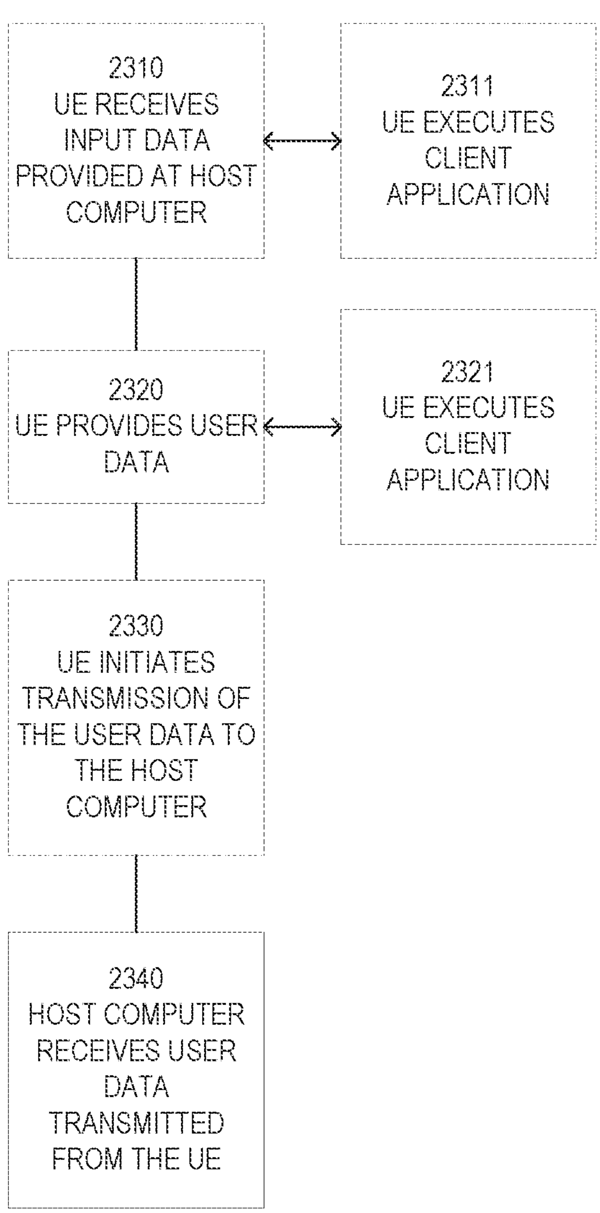
FIG. 20 shows another exemplary method implemented in a communication system in accordance with embodiments of the solution presented herein.

FIG. 20 is a flowchart illustrating a method implemented in a communication system, in accordance with one embodiment. The communication system includes a host computer, a base station and a UE which may be those described with reference to FIGS. 16 and 17. For simplicity of the solution presented herein, only drawing references to FIG. 20 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described herein.

Figure 21:
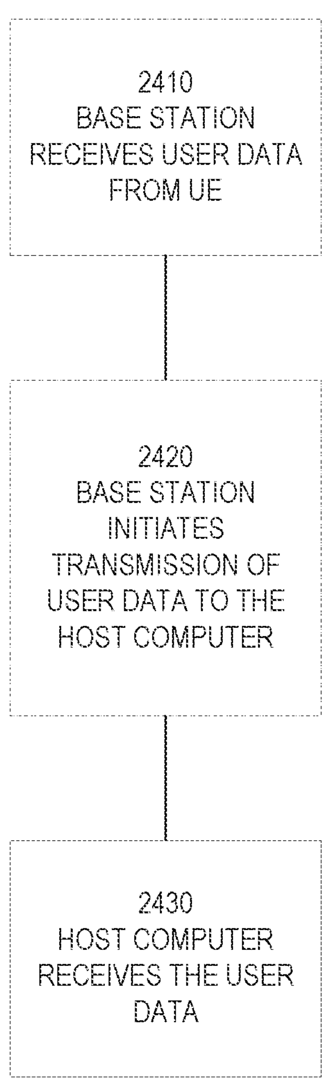
FIG. 21 shows another exemplary method implemented in a communication system in accordance with embodiments of the solution presented herein.

FIG. 21 is a flowchart illustrating a method implemented in a communication system, in accordance with one embodiment. The communication system includes a host computer, a base station and a UE which may be those described with reference to FIGS. 16 and 17. For simplicity of the solution presented herein, only drawing references to FIG. 21 will be included in this section. In step 2410 (which may be optional), in accordance with the teachings of the embodiments described herein, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the solution presented herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following details various non-limiting examples, grouped in separate groups referred to as "Group A Examples," "Group B Examples," "Group C Examples," and Group D Examples."

Group A Examples

1. A method performed by a wireless device for avoiding failure in calculation of SUCI, the method comprising obtaining and storing a PRIORITY_LIST for calculating SUCI; calculating SUCI in an order indicated by the PRIORITY_LIST; and sending the calculated SUCI to a home network (HN) of the wireless device.
2. The method of example 1, further comprising sending an indication of PRIORITY to the HN
3. The method of either of examples 1 and 2, further comprising selecting a lower priority than a highest priority in the PRIORITY_LIST for calculating SUCI; and sending, to the HN, a reason for selecting the lower priority in the PRIORITY_LIST.
4. The method of any of the previous examples, further comprising sending supported schemes to the HN.

5. The method of any of the previous examples, wherein the method is performed wholly or in part by a USIM or ME if the wireless device.

AA. The method of any of the previous examples, further comprising providing user data; and forwarding the user data to a host computer via the transmission to the base station.

Group B Examples

6. A method performed by a base station in a home network (HN) for avoiding failure of a user equipment (UE) (USIM or ME) in calculating SUCI, the method comprising provisioning the UE (USIM or ME) with a PRIORITY_LIST for calculating SUCI.
7. The method of example 6, further comprising detecting that the UE selected a lower priority than a highest priority in the PRIORITY_LIST for calculating SUCI based on one or more of: an HN public key identifier sent by the UE, a scheme identifier sent by the UE, a PRIORITY indication sent by the UE, and/or a reason sent by the UE.
8. The method of example 7, further comprising, based on detecting that the UE selected the lower priority, performing one or more of: re-provisioning the UE (USIM or ME), informing ME vendors, informing USIM vendors, and/or creating a log.
9. The method of any of examples 6-8, further comprising receiving one or more schemes supported by the UE; and performing the provisioning of the UE based on the received one or more schemes.

BB. The method of any of the previous examples, further comprising obtaining user data; and forwarding the user data to a host computer or a wireless device.

Group C Examples

C1. A wireless device configured to perform any of the steps of any of the Group A examples.
C2. A wireless device comprising processing circuitry configured to perform any of the steps of any of the Group A examples; and power supply circuitry configured to supply power to the wireless device.
C3. A wireless device comprising processing circuitry and memory, the memory containing instructions executable by the processing circuitry whereby the wireless device is configured to perform any of the steps of any of the Group A examples.
C4. A user equipment (UE) comprising an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A examples; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.
C5. A computer program comprising instructions which, when executed by at least one processor of a wireless device, causes the wireless device to carry out the steps of any of the Group A examples.
C6. A carrier containing the computer program of example C5, wherein the carrier is one of an electronic signal, optical signal, radio signal, or computer readable storage medium.
C7. A base station configured to perform any of the steps of any of the Group B examples.
C8. A base station comprising processing circuitry configured to perform any of the steps of any of the Group B examples; and power supply circuitry configured to supply power to the wireless device.
C9. A base station comprising processing circuitry and memory, the memory containing instructions executable by the processing circuitry whereby the base station is configured to perform any of the steps of any of the Group B examples.
C10. A computer program comprising instructions which, when executed by at least one processor of a base station, causes the base station to carry out the steps of any of the Group B examples.
C11. A carrier containing the computer program of example 010, wherein the carrier is one of an electronic signal, optical signal, radio signal, or computer readable storage medium.

Group D Examples

D1. A communication system including a host computer comprising processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B examples.
D2. The communication system of the pervious example further including the base station.
D3. The communication system of the previous 2 examples, further including the UE, wherein the UE is configured to communicate with the base station.
D4. The communication system of the previous 3 examples, wherein the processing circuitry of the host computer is configured to execute a host application, thereby providing the user data; and the UE comprises processing circuitry configured to execute a client application associated with the host application.
D5. A method implemented in a communication system including a host computer, a base station and a user equipment (UE), the method comprising at the host computer, providing user data; and at the host computer, initiating a transmission carrying the user data to the UE via a cellular network comprising the base station, wherein the base station performs any of the steps of any of the Group B examples.
D6. The method of the previous example, further comprising, at the base station, transmitting the user data.
D7. The method of the previous 2 examples, wherein the user data is provided at the host computer by executing a host application, the method further comprising, at the UE, executing a client application associated with the host application.
D8. A user equipment (UE) configured to communicate with a base station, the UE comprising a radio interface and processing circuitry configured to perform any of the previous 3 examples.

D9. A communication system including a host computer comprising processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A examples.

D10. The communication system of the previous example, wherein the cellular network further includes a base station configured to communicate with the UE.

D11. The communication system of the previous 2 examples, wherein the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising at the host computer, providing user data; and at the host computer, initiating a transmission carrying the user data to the UE via a cellular network comprising the base station, wherein the UE performs any of the steps of any of the Group A examples.

D13. The method of the previous example, further comprising at the UE, receiving the user data from the base station.

D14. A communication system including a host computer comprising communication interface configured to receive user data originating from a transmission from a user equipment (UE) to a base station, wherein the UE comprises a radio interface and processing circuitry, the UE's processing circuitry configured to perform any of the steps of any of the Group A examples.

D15. The communication system of the previous example, further including the UE.

D16. The communication system of the previous 2 examples, further including the base station, wherein the base station comprises a radio interface configured to communicate with the UE and a communication interface configured to forward to the host computer the user data carried by a transmission from the UE to the base station.

D17. The communication system of the previous 3 examples, wherein the processing circuitry of the host computer is configured to execute a host application; and the UE's processing circuitry is configured to execute a client application associated with the host application, thereby providing the user data.

D18. The communication system of the previous 4 examples, wherein the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising at the host computer, receiving user data transmitted to the base station from the UE, wherein the UE performs any of the steps of any of the Group A examples.

D20. The method of the previous example, further comprising, at the UE, providing the user data to the base station.

D21. The method of the previous 2 examples, further comprising at the UE, executing a client application, thereby providing the user data to be transmitted; and at the host computer, executing a host application associated with the client application.

D22. The method of the previous 3 examples, further comprising at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B examples.

D24. The communication system of the previous example further including the base station.

D25. The communication system of the previous 2 examples, further including the UE, wherein the UE is configured to communicate with the base station.

D26. The communication system of the previous 3 examples, wherein the processing circuitry of the host computer is configured to execute a host application; the UE is configured to execute a client application associated with the host application, thereby providing the user data to be received by the host computer.

D27. A method implemented in a communication system including a host computer, a base station and a user equipment (UE), the method comprising at the host computer, receiving, from the base station, user data originating from a transmission which the base station has received from the UE, wherein the UE performs any of the steps of any of the Group A examples.

D28. The method of the previous example, further comprising at the base station, receiving the user data from the UE.

D29. The method of the previous 2 examples, further comprising at the base station, initiating a transmission of the received user data to the host computer.

The solution presented herein may, of course, be carried out in other ways than those specifically set forth herein without departing from essential characteristics of the solution presented herein. The examples presented herein are to be considered in all respects as illustrative and not restrictive, and all changes coming within the meaning and equivalency range of the appended claims are intended to be embraced therein.

What is claimed is:

1. A method, performed by a network node in a home network (HN) of a wireless device, for avoiding failure of a calculation of a subscription identifier by the wireless device, the method comprising:

assigning a different priority to each of a plurality of parameter sets, wherein each parameter set comprises one or more parameters used for calculating the subscription identifier; and providing the wireless device with a priority list to facilitate the calculation of the subscription identifier by the wireless device, wherein the priority list indicates the priority assigned to each of the parameter sets.

2. The method of claim 1 wherein the subscription identifier comprises a Subscription Concealed Identifier (SUCI).

3. The method of claim 1 wherein the one or more parameters of each parameter set comprise a scheme identifier and/or a HN public key identifier.

4. The method of claim 1 further comprising:

receiving a subscription identifier calculated by the wireless device using one of the parameter sets in the priority list selected responsive to the assigned priorities; and identifying a subscription of the wireless device using the received subscription identifier.

5. The method of claim 4 wherein the received subscription identifier comprises a subscription identifier calculated using the parameter set having the highest priority in the priority list.

6. The method of claim 4, wherein the received subscription identifier comprises a subscription identifier calculated using a parameter set in the priority list having a lower priority than one or more parameter sets in the priority list having a higher priority responsive to a known or suspected problem with the one or more of the higher priority parameter sets.

7. The method of claim 6, further comprising:

detecting that the wireless device used the lower priority parameter set; and responsive to the detection:

re-providing the wireless device with the priority list; and/or informing Mobile Equipment (ME) vendors of the detection; and/or informing Universal Subscriber Entity Module (USIM) vendors of the detection; and/or creating a log of the selection of the lower priority parameter set.

8. The method of claim 1 further comprising receiving, from the wireless device, an indication of the parameter set used by the wireless device to calculate the subscription identifier.

9. The method of claim 1:

further comprising receiving, from the wireless device, an indication of one or more parameter sets supported by the wireless device; and wherein said assigning comprises assigning a different priority to each of the one or more parameter sets identified by the indication.

10. A network node comprising:

communication circuitry configured to send downlink signals to a wireless device and receive uplink signals from the wireless device; and processing circuitry configured to:

assign a different priority to each of a plurality of parameter sets, wherein each parameter set comprises one or more parameters used for calculating a subscription identifier; and provide the wireless device with a priority list to facilitate the calculation of the subscription identifier by the wireless device, wherein the priority list indicates the priority assigned to each of the parameter sets.

11. The network node of claim 10, wherein the subscription identifier comprises a Subscription Concealed Identifier (SUCI).

12. The network node of claim 10, wherein the one or more parameters of each parameter set comprise a scheme identifier and/or a HN public key identifier.

13. The network node of claim 10, wherein the processing circuitry is further configured to:

receive a subscription identifier calculated by the wireless device using one of the parameter sets in the priority list selected responsive to the assigned priorities; and identify a subscription of the wireless device using the received subscription identifier.

14. The network node of claim 13, wherein the received subscription identifier comprises a subscription identifier calculated using the parameter set having the highest priority in the priority list.

15. The network node of claim 13, wherein the received subscription identifier comprises a subscription identifier calculated using a parameter set in the priority list having a lower priority than one or more parameter sets in the priority list having a higher priority responsive to a known or suspected problem with the one or more of the higher priority parameter sets.

16. The network node of claim 15, wherein the processing circuitry is further configured to:

detect that the wireless device used the lower priority parameter set; and responsive to the detection:

re-provide the wireless device with the priority list; and/or inform Mobile Equipment (ME) vendors of the detection; and/or inform Universal Subscriber Entity Module (USIM) vendors of the detection; and/or create a log of the selection of the lower priority parameter set.

17. The network node of claim 10, wherein the processing circuitry is further configured to receive, from the wireless device, an indication of the parameter set used by the wireless device to calculate the subscription identifier.

18. The network node of claim 10, wherein:

the processing circuitry is further configured to receive, from the wireless device, an indication of one or more parameter sets supported by the wireless device; and to assign, the processing circuitry assigns a different priority to each of the one or more parameter sets identified by the indication.

19. A non-transitory computer program product stored in a non-transitory computer readable medium for controlling a network node in communication with a wireless device, the computer program product comprising software instructions, which, when run on processing circuitry of the network node, causes the network node to:

assign a different priority to each of a plurality of parameter sets, wherein each parameter set comprises one or more parameters used for calculating a subscription identifier; and provide the wireless device with a priority list to facilitate the calculation of the subscription identifier by the wireless device, wherein the priority list indicates the priority assigned to each of the parameter sets.

* * * * *